US012578928B2

(12) United States Patent
Woodward, Jr. et al.

(10) Patent No.:    US 12,578,928 B2
(45) Date of Patent:       Mar. 17, 2026

(54) SOFTWARE DEVELOPMENT PLATFORM FOR INTERNET OF THINGS APPLICATIONS

(71) Applicant: ROKU, INC., San Jose, CA (US)

(72) Inventors: Donald R Woodward, Jr., Monte Sereno, CA (US); Anthony J. Wood, Palo Alto, CA (US); David L. Stern, Los Gatos, CA (US); Gregory M. Garner, Key Colony Beach, FL (US)

(73) Assignee: ROKU, INC., San Jose, CA (US)

( * ) Notice: Subject to any disclaimer, the term of this patent is extended or adjusted under 35 U.S.C. 154(b) by 224 days.

(21) Appl. No.: 18/231,899

(22) Filed: Aug. 9, 2023

(65) Prior Publication Data

US 2025/0053383 A1     Feb. 13, 2025

(51) Int. Cl.
    *G06F 8/30*          (2018.01)
(52) U.S. Cl.
    CPC ..................................... *G06F 8/30* (2013.01)
(58) Field of Classification Search
    CPC ....................................................... G06F 8/30
    USPC .................................. 717/106–113, 174–178
    See application file for complete search history.

(56) References Cited

U.S. PATENT DOCUMENTS

| | | | | |
|---|---|---|---|---|
| 10,255,067 B2 * | 4/2019 | Noens | ..................... | H04W 4/70 |
| 11,126,635 B2 * | 9/2021 | Behzadi | ................ | G06F 16/283 |
| 11,836,817 B2 * | 12/2023 | Hunn | ....................... | H04L 63/12 |
| 2016/0357522 A1 * | 12/2016 | Wee | ......................... | G06F 16/29 |
| 2016/0357523 A1 | 12/2016 | Zhang et al. | | |
| 2018/0143825 A1 | 5/2018 | Noens | | |
| 2024/0365083 A1 | 10/2024 | Garner et al. | | |

FOREIGN PATENT DOCUMENTS

| | | |
|---|---|---|
| CN | 1512717 A | 7/2004 |

OTHER PUBLICATIONS

McCaffrey, "Machine Learning with IoT Devices on the Edge", 2018, MSDN Magazine, 10 pages. (Year: 2018).*
Phalake et al., "Modernized Application Development Using Optimized Low Code Platform", 2022, IEEE, 4 pages. (Year: 2022).*

(Continued)

*Primary Examiner* — Ted T. Vo
(74) *Attorney, Agent, or Firm* — STERNE, KESSLER, GOLDSTEIN & FOX P.L.L.C.

(57)                ABSTRACT

Disclosed herein are system, method and/or computer program product embodiments, and/or combinations and sub-combinations thereof for providing a platform for developing an application that interacts with a set of IoT devices. An embodiment provides a source code editor that enables a user to generate source code of the application and an application builder that generates an executable version of the application based at least on the generated source code. Generating the source code includes defining an input or output of the application as an event that is mappable to a first set of IoT devices in a first network of IoT devices when the application is installed thereto and to a second set of IoT devices in a second network of IoT devices when the application is installed thereto, the first set of IoT devices including at least one device type not included in the second set of IoT devices.

20 Claims, 8 Drawing Sheets

(56)           References Cited

OTHER PUBLICATIONS

Extended European Search Report of the European Patent Office directed to related European Patent Application No. 24193682.2, mailed Dec. 10, 2024; 12 pages.
Scuillo et al. "WoT Store: Enabling Things and Application Discovery for the W3C Web of Things," 2019 16th IEEE Annual consumer Communications & Networking Conference (CCNC), IEEE, Jan. 11, 2019, 8 pages.

* cited by examiner

500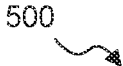

| |
|---|
| Provide a source code editor that enables a user to generate source code of the IoT application, wherein enabling the user to generate the source code of the IoT application includes enabling the user to define an input/output of the IoT application as an event, the event being mappable to a first set of IoT devices in a first network of IoT devices when the IoT application is installed thereto and to a second set of IoT devices in a second network of IoT devices when the IoT application is installed thereto |

~502

| |
|---|
| Provide an IoT application builder that generates an executable version of the IoT application based at least on the generated source code of the IoT application |

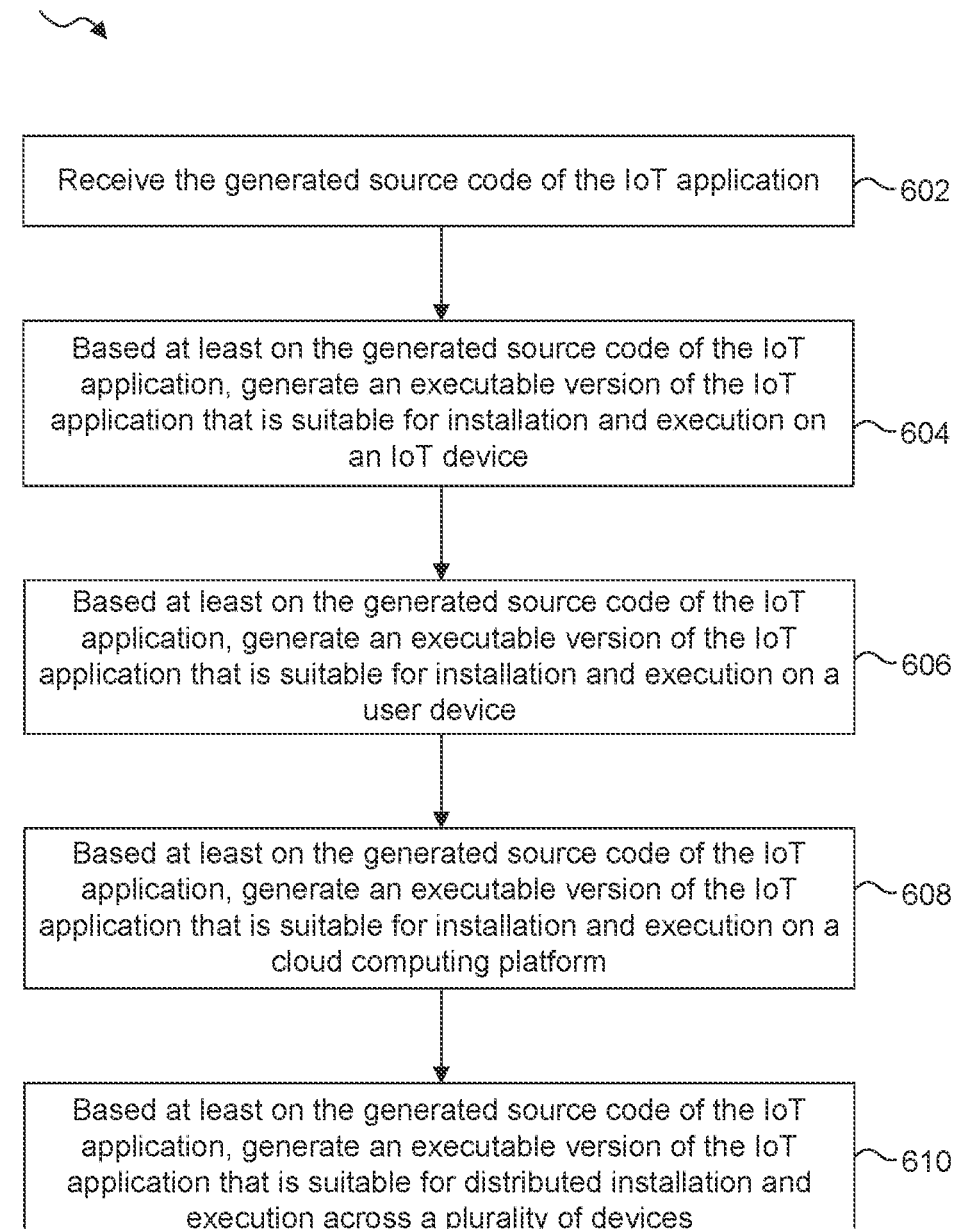

Receive the generated source code of the IoT application ~602

Based at least on the generated source code of the IoT application, generate an executable version of the IoT application that is suitable for installation and execution on an IoT device ~604

Based at least on the generated source code of the IoT application, generate an executable version of the IoT application that is suitable for installation and execution on a user device ~606

Based at least on the generated source code of the IoT application, generate an executable version of the IoT application that is suitable for installation and execution on a cloud computing platform ~608

Based at least on the generated source code of the IoT application, generate an executable version of the IoT application that is suitable for distributed installation and execution across a plurality of devices ~610

FIG. 6

700

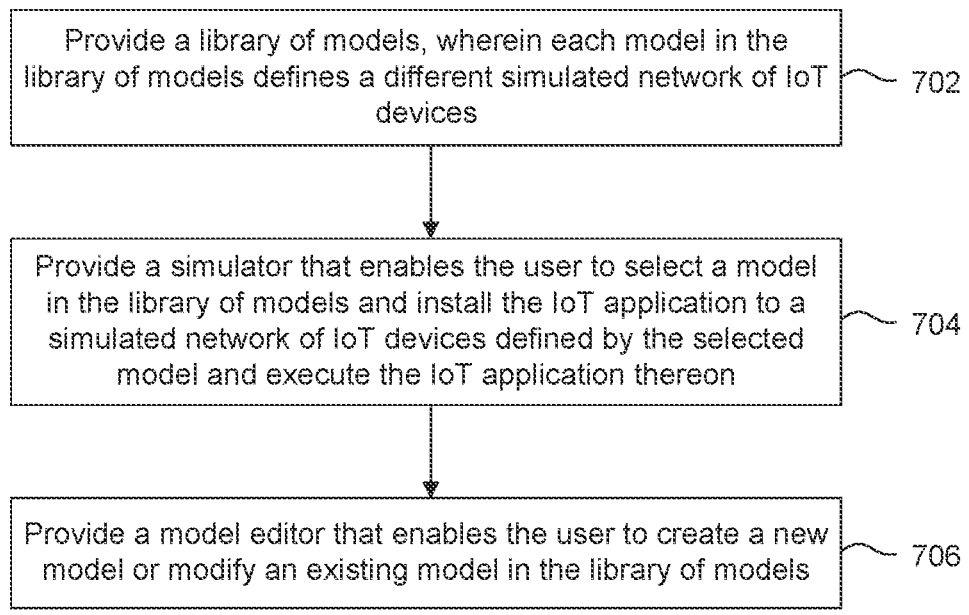

Provide a library of models, wherein each model in the library of models defines a different simulated network of IoT devices    ~ 702

Provide a simulator that enables the user to select a model in the library of models and install the IoT application to a simulated network of IoT devices defined by the selected model and execute the IoT application thereon    ~ 704

Provide a model editor that enables the user to create a new model or modify an existing model in the library of models    ~ 706

FIG. 7

SOFTWARE DEVELOPMENT PLATFORM FOR INTERNET OF THINGS APPLICATIONS

BACKGROUND

Field

This disclosure is generally directed to a platform for developing software applications, and in particular, to a platform for developing software applications that are configured to control or otherwise interact with one or more Internet of Things (IoT) devices.

SUMMARY

Provided herein are system, apparatus, article of manufacture, method and/or computer program product embodiments, and/or combinations and sub-combinations thereof, for providing a platform for developing an application that interacts with a set of IoT devices. An embodiment provides a source code editor that enables a user to generate source code of the application and an application builder that generates an executable version of the application based at least on the generated source code. Enabling the user to generate the source code of the application includes enabling the user to define an input or output of the application as an event, the event being mappable to a first set of IoT devices in a first network of IoT devices when the application is installed thereto and to a second set of IoT devices in a second network of IoT devices when the application is installed thereto, the first set of IoT devices including at least one device type not included in the second set of IoT devices.

In an embodiment, the source code editor enables the user to associate a generic IoT device function with the event and the generic IoT device function is mappable to a first IoT device in the first network of IoT devices when the application is installed thereto and to a second IoT device in the second network of IoT devices when the application is installed thereto.

In another embodiment, the source code editor enables the user to associate a generic IoT device type with the event and the generic IoT device type is mappable to a first IoT device in the first network of IoT devices when the application is installed thereto and to a second IoT device in the second network of IoT devices when the application is installed thereto.

In yet another embodiment, the source code editor enables the user to specify a machine learning model to be used to identify an occurrence of the event when the input of the application is defined as the event.

In still another embodiment, providing the application builder comprises providing an application builder that, based at least on the generated source code of the application, generates two or more of: an executable version of the application that is suitable for installation and execution on an IoT device; an executable version of the application that is suitable for installation and execution on a user device; an executable version of the application that is suitable for installation and execution on a cloud computing platform; or an executable version of the application that is suitable for distributed installation and execution across a plurality of devices.

In a further embodiment, the source code editor enables the user to selectively generate the source code in one of a plurality of programming languages, and the application builder is configured to generate the executable version of the application based at least on the source code of the application selectively generated in the one of the plurality of programming languages.

In a still further embodiment, providing the platform for developing the application also includes providing a simulator that enables the user to install the application to a simulated network of IoT devices and execute the application thereon. In accordance with such an embodiment, providing the platform for developing the application may also include providing a library of models, wherein each model in the library of models defines a different simulated network of IoT devices, and the simulator may enable the user to select a model in the library of models and install the application to a simulated network of IoT devices defined by the selected model and execute the application thereon. In further accordance with such an embodiment, providing the platform for developing the application may also include providing a model editor that enables the user to create a new model or modify an existing model in the library of models.

In a yet further embodiment, providing the platform for developing the application also includes providing an application template that may be customized by the user to generate the source code of the application.

In an additional embodiment, providing the platform for developing the application also includes providing a wizard that guides the user through a series of steps to generate the source code of the application.

BRIEF DESCRIPTION OF THE FIGURES

The accompanying drawings are incorporated herein and form a part of the specification.

FIG. 5 illustrates a flow diagram of a method for providing a platform for developing an IoT application, according to some embodiments.

FIG. 6 illustrates a flow diagram of a method for generating different executable versions of an IoT application for installation and execution on a variety of different host devices.

FIG. 7 illustrates a flow diagram of a method for providing a platform for developing an IoT application that enables a user of the platform to execute the IoT application on a simulated network of IoT devices.

In the drawings, like reference numbers generally indicate identical or similar elements. Additionally, generally, the left-most digit(s) of a reference number identifies the drawing in which the reference number first appears.

DETAILED DESCRIPTION

Figure 1:
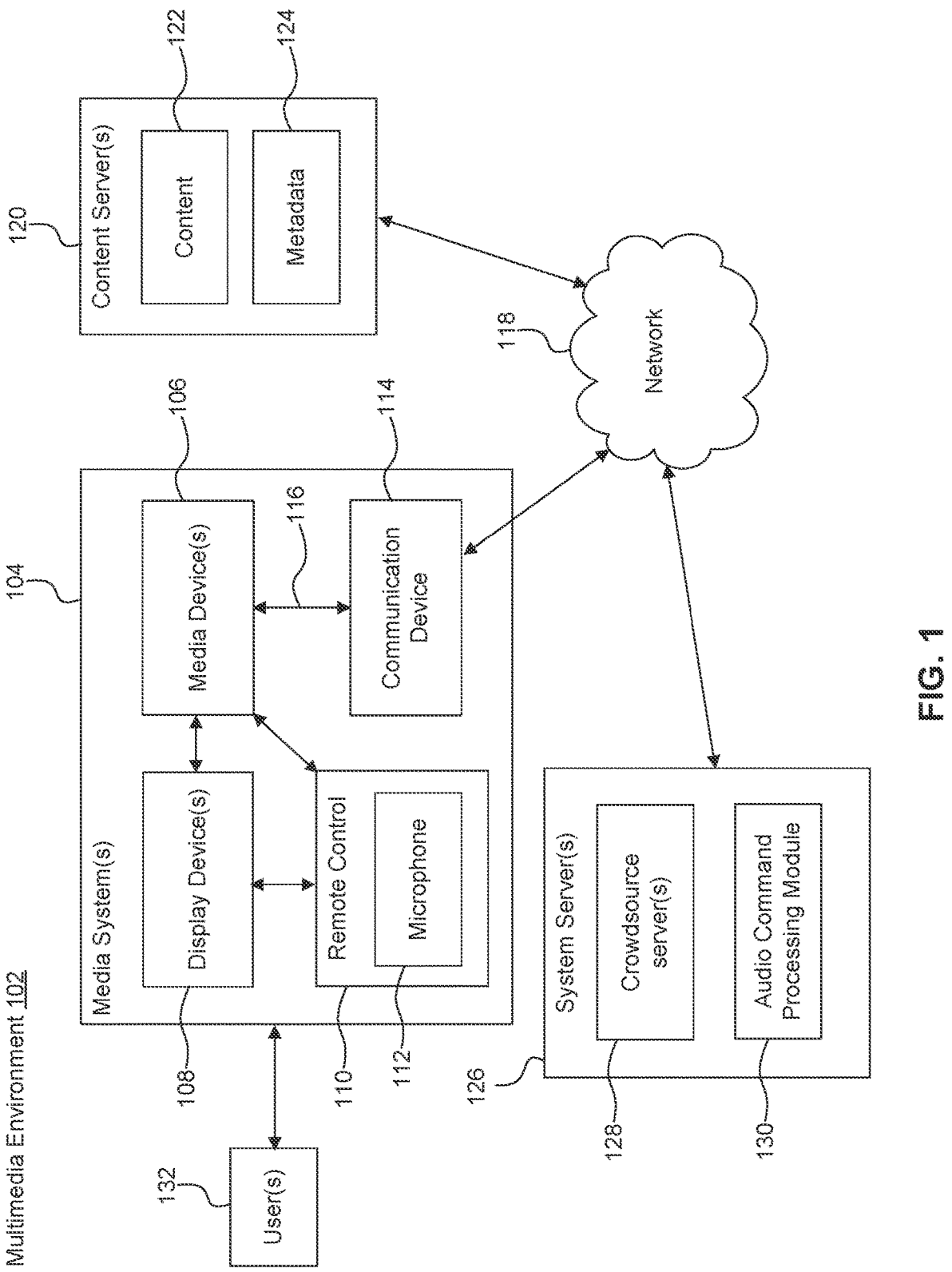
FIG. 1 illustrates a block diagram of a multimedia environment, according to some embodiments.

Modern living and working spaces, such as homes, hotels, or offices, are increasingly equipped with many devices that are configured to engage in digital communications. These devices may range from traditional internet-connected devices such as personal computers, telephone systems, security systems, gaming systems, and over-the-top (OTT) streaming media players, to newer devices including "smart home" devices such as connected appliances, utilities, lights, switches, power outlets, and speakers, as well as wearable devices such as watches and/or health monitors, among countless other examples. These devices may generally be referred to as "Internet of Things" (IoT) devices.

Typically, software for controlling an IoT device, such as a "smart home" device, is developed by the manufacturer of the IoT device and pre-installed on the IoT device before it is distributed to a consumer. Consequently, the consumer is limited to using only this manufacturer-supplied software to control the IoT device. Furthermore, the software that ships with a particular/IoT device typically provides only a limited set of capabilities that are directly tied to the particular sensors and/or actuators that exist on that IoT device. Additionally, other than a predefined set of user-configurable device settings or preferences, there is typically no means provided by which an end user can experiment with or creatively exploit the features (e.g., hardware features) of the IoT device. Moreover, a given user may own a diverse set of IoT devices, but such IoT devices typically cannot operate together to perform useful functions unless they are manufactured by the same company and configured from the outset to do so.

Provided herein are system, apparatus, device, method and/or computer program product embodiments, and/or combinations and sub-combinations thereof, for providing a platform for developing an application that interacts with one or more IoT devices ("an IoT application") and that may be distributed, for example, via an IoT application store, that addresses one or more of the foregoing issues associated with conventional IoT device installations. Providing the platform for developing the IoT application may include providing a source code editor that enables a user to generate source code of the IoT application and an application builder that generates an executable version of the application based at least on the generated source code of the IoT application.

Enabling the user to generate the source code of the IoT application may comprise, for example, enabling the user to define an input of the IoT application or an output of the IoT application as an event, the event being mappable to a first set of IoT devices in a first network of IoT devices when the IoT application is installed thereto and to a second set of IoT devices in a second network of IoT devices when the IoT application is installed thereto, the first set of IoT devices including at least one IoT device of a type that is not included in the second set of IoT devices.

Providing the application builder may comprise providing an application builder that, based at least on the generated source code of the application, generates two or more of: an executable version of the IoT application that is suitable for installation and execution on an IoT device; an executable version of the IoT application that is suitable for installation and execution on a user device; an executable version of the IoT application that is suitable for installation and execution on a cloud computing platform; or an executable version of the IoT application that is suitable for distributed installation and execution across a plurality of devices.

Providing the platform for developing the IoT application may include one or more of the following: providing a simulator that enables the user to install the application to a simulated network of IoT devices and execute the application thereon (e.g., for testing and debugging the IoT application), providing a library of models, wherein each model in the library of models defines a different simulated network of IoT devices upon which the IoT application may be installed via the simulator; providing a model editor that enables the user to create a new model or modify an existing model in the library of models; providing an IoT application template that may be customized by the user to generate the source code of the IoT application, or providing a wizard that guides the user through a series of steps to generate the source code of the IoT application.

These and various other features and advantages of a platform for developing an IoT application that may be provided in accordance with various embodiments will be described in detail herein. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
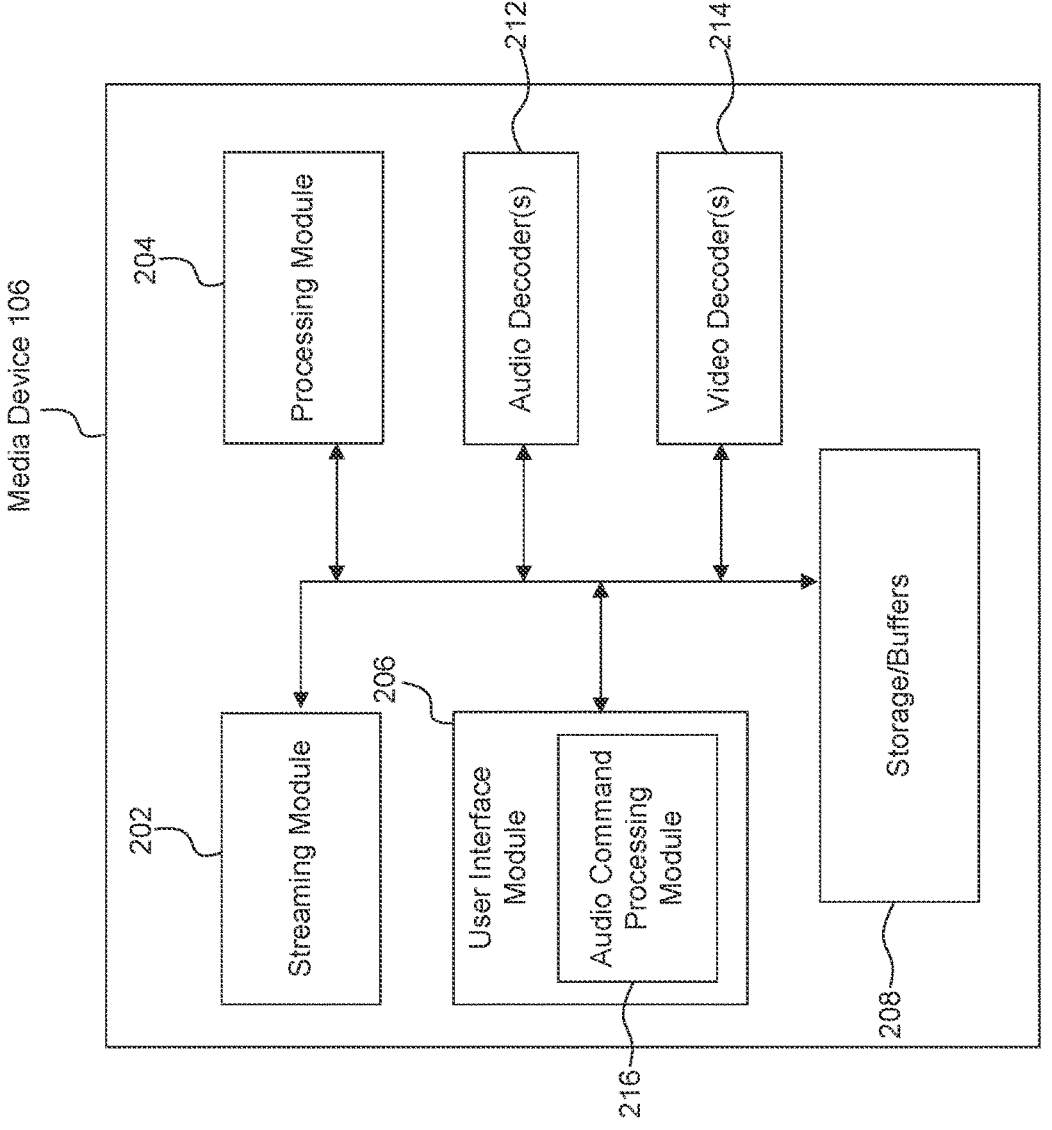
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPIa, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Software Development Platform for Internet of Things Applications

Figure 3:
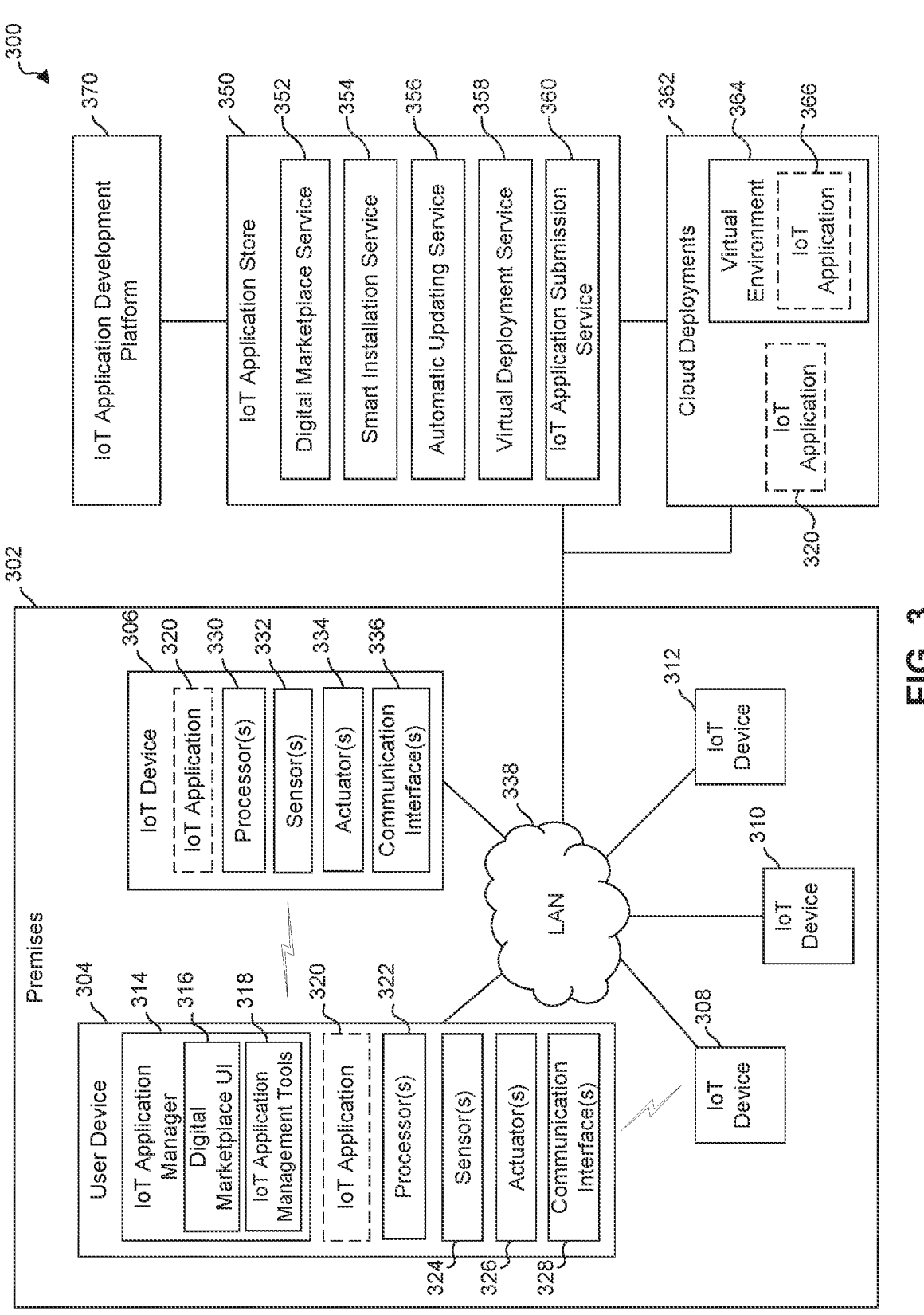
FIG. 3 illustrates a block diagram of a system for developing and distributing an IoT application, according to some embodiments.

FIG. 3 illustrates a block diagram of a system 300 for developing and distributing an IoT application, according to some embodiments. As shown in FIG. 3, system 300 includes a premises 302, an IoT application store 350, and an IoT application development platform 370. Each of these aspects of system 300 will now be described.

Premises 302

As shown in FIG. 3, system 300 includes a premises 302 in which a plurality of IoT devices 306, 308, 310 and 312 are present. Premises 302 may comprise, for example and without limitation, a home, an office, a building, a factory, a warehouse, a bar, a restaurant, a movie theater, a stadium, an auditorium, a car, a bus, a boat, or any other structure, location or space in which IoT devices may be present. Although only four IoT devices are shown as being present in premises 302 for the sake of illustration, it should be understood that premises 302 may include any number of IoT devices, including tens, hundreds or even thousands of IoT devices.

As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet.

Each of IoT devices 306, 308, 310 and 312 may comprise a device such as, for example, a smart phone, a laptop computer, a notebook computer, a tablet computer, a netbook, a desktop computer, a video game console, a set-top box, or an OTT streaming media player. Furthermore, each of IoT devices 306, 308, 310 and 312 may comprise a so-called "smart home" device such as, for example, a smart lightbulb, a smart switch, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart plug, a smart television, a smart speaker, a smart remote controller, or a voice controller. Still further, each of IoT devices 306, 308, 310 and 312 may comprise a wearable device such as a watch, a fitness tracker, a health monitor, a smart pacemaker, or an extended reality headset. However, these are only examples and are not intended to be limiting.

IoT devices 306, 308, 310 and 312 may be communicatively connected to a local area network (LAN) 338 via a suitable wired and/or wireless connection. LAN 338 may be implemented using a hub-and-spoke or star topology. For example, in accordance with such an implementation, each of IoT devices 306, 308, 310 and 312 may be connected to a router via a corresponding Ethernet cable, wireless access point (AP), or IoT device hub. The router may include a modem that enables the router to act as an interface between entities connected to LAN 338 and an external wide area network (WAN), such as the Internet. Alternatively, LAN 338 may be implemented using a full or partial mesh network topology. In accordance with a full mesh network topology, each IoT device in the set of IoT devices in premises 302 may be directly connected to each of the other IoT devices in the premises such that it can communicate therewith without a router. In accordance with a partial mesh network technology, only some of the IoT devices in premises 302 may be directly connected to other ones of the IoT devices, and indirect communication between unconnected IoT device pairs may be carried out through one or more intervening devices. A mesh network implementation of LAN 338 may likewise be connected to an external WAN, such as the Internet, via a router. However, these are examples only, and other techniques for implementing LAN 338 may be used.

As further shown in FIG. 3, IoT device 306 may comprise one or more processors 330, one or more sensors 332, one or more actuators 334, and one or more communication interfaces 336. Processor(s) 330 may comprise one or more central processing units (CPUs), microcontrollers, microprocessors, signal processors, ASICs (application specific integrated circuits), and/or other physical hardware processor circuits for performing tasks such as program execution, signal coding, data processing, input/output processing, power control, and/or other functions.

Sensor(s) 332 may comprise one or more devices or systems for detecting and responding to (e.g., measuring, recording) objects and events in the physical environment of IoT device 306. By way of example only and without limitation, sensor(s) 332 may include one or more of a camera or other optical sensor, a microphone or other audio sensor, a radar system, a LiDAR system, a Wi-Fi sensing system, a temperature sensor, a pressure sensor, a proximity sensor, an accelerometer, a gyroscope, a magnetometer, an infrared sensor, a gas sensor, or a smoke sensor.

Actuator(s) 334 may comprise one or more devices or systems that are operable to effect a change in the physical environment of IoT device 306. By way of example only and without limitation, actuator(s) 334 may comprise a component that connects a device to a power source, disconnects a device from a power source, switches a light on or off, adjusts a brightness or a color of a light, turns an audible alarm on or off, adjusts the volume of an audible alarm, initiates a call to a security service, turns a heating or cooling system on or off, adjusts a target temperature associated with a heating or cooling system, locks or unlocks a door, rings a doorbell, initiates capture of video or audio, changes a channel or configuration of a television, adjusts the volume of an audio output device, or the like.

Communication interface(s) 336 may comprise components suitable for enabling IoT device 306 to wirelessly communicate with other devices via a corresponding wireless protocol. Communication interface(s) 336 may include, for example and without limitation, one or more of: a Wi-Fi interface that enables IoT device 306 to wirelessly communicate with an access point or other remote Wi-Fi-capable device according to one or more of the wireless network protocols based on the IEEE (Institute of Electrical and Electronics Engineers) 802.11 family of standards, a cellular interface that enables IoT device 306 to wirelessly communicate with remote devices via one or more cellular networks, a Bluetooth interface that enables IoT device 306 to engage in short-range wireless communication with other Bluetooth-enabled devices, or a Zigbee interface that enables IoT device 306 to wirelessly communicate with other Zigbee-enabled devices.

Communication interface(s) 336 may additionally or alternatively comprise components suitable for enabling IoT device 306 to communicate over a wired connection with other devices via a corresponding wired protocol, such as a Universal Serial Bus (USB) connection and protocol or Ethernet connection and protocol.

As further shown in FIG. 3, IoT device 306 may have installed thereon an instance of an IoT application 320, or a distributed component thereof. As will be discussed herein, such IoT application 320 may be selected for installation by a user from among a plurality of IoT applications presented by a digital marketplace service 352 of an IoT application store 350. In a case in which the instance of IoT application 320 is installed on IoT device 306, such instance may be executed by processor(s) 330.

Each of IoT devices 308, 310 and 312 may include similar components to those shown with respect to IoT device 306. Thus, for example, each of IoT device 308, 310 and 312 may include one or more processors, one or more sensors, one or more actuators, and one or more communication interfaces. Likewise, each of IoT devices 308, 310 and 312 may have installed thereon an instance of IoT application 320 or a distributed component thereof.

User device 304 is intended to represent a personal computing device or media device associated with a user. For example, in an embodiment in which multimedia environment is present in premises 302, user device 304 may comprise media device 106, and a user interface of user device 304 may be presented to a user via display device 108. User device 304 may also comprise a smart phone, a laptop computer, a notebook computer, a tablet computer, a netbook, a desktop computer, a video game console, or a wearable device (e.g., smart watch, extended reality headset). User device 304 may include one or more processors 322, one or more sensor(s) 324, one or more actuators 326, one or more communication interfaces 328, and an IoT application manager 314.

Processor(s) 322 may comprise one or more CPUs, microcontrollers, microprocessors, signal processors, ASICs, and/or other physical hardware processor circuits for performing tasks such as program execution, signal coding, data processing, input/output processing, power control, and/or other functions.

Sensor(s) 324 may comprise one or more devices or systems for detecting and responding to (e.g., measuring, recording) objects and events in the physical environment of user device 304. Sensor(s) 324 may include, for example, one or more of the sensor types previously described in reference to sensor(s) 332 of IoT device 306.

Actuator(s) 326 may comprise one or more devices or systems that are operable to effect a change in the physical environment of user device 304. Actuator(s) 326 may comprise, for example, one or more of the actuator types previously described in reference to actuator(s) 334 of IoT device 306.

Communication interface(s) 328 may comprise components suitable for enabling user device 304 to communicate with other devices via a wired or wireless communication medium using a corresponding wired or wireless communication protocol. Communication interface(s) 328 may comprise, for example, one or more of the communication interface types previously described in reference to communication interface(s) 336 of IoT device 306.

IoT application manager 314 may be implemented as processing logic that can comprise hardware (e.g., circuitry, dedicated logic, programmable logic, microcode, etc.), software (e.g., instructions executing on a processing device), or a combination thereof. IoT application manager 314 may comprise a software application that is executed by processor(s) 322 of user device 304. IoT application manager 314 may enable a user to browse, install, configure and execute IoT applications that are configured to control or otherwise interact with IoT devices present in premises 302, including one or more of IoT devices 306, 308, 310 and 312. As shown in FIG. 3, IoT device manager 314 may include a digital marketplace user interface (UI) 316 and IoT application management tools 318.

Digital marketplace UI 316 may comprise a UI that enables a user to browse various IoT applications presented by digital marketplace service 352 of IoT application store 350 (described in more detail herein), and select IoT applications for installation. In certain embodiments or scenarios, selecting an IoT application for installation may entail purchasing the IoT application. Such IoT applications may be used to control or otherwise interact with IoT devices within premises 302, including one or more of IoT devices 306, 308, 310 and 312. Depending upon the implementation, digital marketplace UI 316 may comprise a graphical UI (GUI), a menu-driven UT, a touch UI, a voice UI, a form-based UI, a natural language UI, or the like.

IoT application management tools 318 may comprise functionalities of IoT device manager 314 that enable a user to manage an installed instance of an IoT application. For example, IoT application management tools 318 may enable a user to configure, execute or uninstall a previously-installed instance of an IoT application. IoT application management tools 318 may further enable a user to invoke an automatic updating service 356 of IoT application store 350. As will be discussed herein, automatic updating service 356 may automatically reconfigure inputs, outputs and/or other aspects of an installed instance of an IoT application in response to changes detected with respect to IoT devices in premises 302, as well as in response to other factors.

As further shown in FIG. 3, user device 304 may have installed thereon an instance of IoT application 320, or a distributed component thereof. As previously noted, such IoT application 320 may be selected for installation by a user from among a plurality of IoT applications presented by digital marketplace service 352 of IoT application store 350. In a case in which the instance of IoT application 320 is installed on user device 304, such instance may be executed by processor(s) 322.

Although only a single user device 304 is shown in FIG. 3, it is to be understood that multiple user devices may be present in premises 302, and each such user device may be configured in a like manner to user device 304. Furthermore, although IoT application manager 314 is shown as part of user device 304 in FIG. 3, it should be understood that additional instances of IoT application manager 314 may be implemented on other devices within premises 302, including on one or more of IoT devices 306, 308, 310 or 312.

Additionally, although only a single premises 302, with associated user device 304 and set of IoT devices 306, 308, 310 and 312, is shown in FIG. 3 for the sake of simplicity, it is to be understood that system 300 may include any number of premises (including hundreds, thousands, tens of thousands, hundreds of thousands, millions, or hundreds of millions of premises), each with its own user device(s) and IoT devices, and that IoT application store 350 may be used to distribute IoT applications to each such premises for use in conjunction with the IoT devices deployed therein.

IoT Application Store 350

As further shown in FIG. 3, system 300 includes an IoT application store 350. IoT application store 350 may be implemented as processing logic that can comprise hardware (e.g., circuitry, dedicated logic, programmable logic, microcode, etc.), software (e.g., instructions executing on a processing device), or a combination thereof. IoT application store 350 may be implemented by one or more devices (e.g., one or more servers) that are remote from premises 302 but communicatively connected thereto (e.g., communicatively connected to LAN 338) via one or more networks. However, certain features of IoT application store 350 that are described herein may alternatively be implemented by a device within premises 302, such as by user device 304, or one of IoT devices 306, 308, 310, 312.

IoT application store 350 may comprise a digital marketplace service 352. Digital marketplace service 352 may enable a user (e.g., a user associated with premises 302) to browse a plurality of IoT applications and to select certain IoT applications in the plurality of IoT applications for installation. For example, a user may interact with digital marketplace service 352 via digital marketplace UI 316 to browse a plurality of IoT applications that are available for installation and to potentially select one or more IoT applications for installation.

Digital marketplace service 352 may support a search feature that enables a user to search for IoT applications based on one or more user-provided inputs such as, but not limited to, keywords or natural language descriptions. Digital marketplace service 352 may organize available IoT applications into different classes or categories, and enable a user to browse within such classes or categories. The classes or categories may be defined based on functionality, applicable IoT device type(s), or the like. Digital marketplace service 352 may rank IoT applications by popularity, cost, user reviews, or the like, and such rankings may be presented for all IoT applications or for IoT applications within a particular class or category.

Digital marketplace service 352 may be able to access information about a set of IoT devices associated with a user. For example, digital marketplace service 352 may be able to access information about IoT devices associated with a user in premises 302, including IoT devices 306, 308, 310 and 312. Such information may include, for example and without limitation, a device type, a device manufacturer, a device model, a device software/firmware version, a description of device capabilities, a description of device sensor types, a description of device actuator types, or the like, associated with each IoT device in the set of IoT devices associated with the user. Digital marketplace service 352 may utilize such information to filter an available set of IoT applications to identify a subset thereof that is operable with or otherwise relevant to particular IoT devices in the set of IoT devices associated with the user, and to present the subset of IoT applications to the user.

Digital marketplace service 352 may enable a user to purchase an IoT application as part of selecting the IoT application for installation. Any of a wide variety of well-known digital payment methods may be used to transact a purchase of an IoT application. Digital marketplace service 352 may also enable a user to selectively install an IoT application for free or on a trial basis. IoT application store 350 may also represent a non-commercial means for distributing IoT applications, in which case all of the IoT applications made available by digital marketplace service 352 may be selectively installed free of charge. For example, IoT application store 350 may be implemented by an enterprise and used to distribute IoT applications to various offices, factories, or other locations within the enterprise free of charge.

IoT applications made available for distribution by digital marketplace service 352 may comprise software that, when executed by one or more processors, controls or interacts with one or more IoT devices. For example, an IoT application may collect sensor data from one or more sensors of one or more IoT devices and process such collected sensor data for a variety of purposes. As another example, an IoT application may control one or more actuators of one or more IoT devices to perform one or more actions. By way of further example, an IoT application may collect sensor data from one or more sensors of one or more IoT devices, process the collected sensor data, and, based on the processing of the collected sensor data, control one or more actuators of one or more IoT devices to perform one or more actions.

IoT applications made available for distribution by digital marketplace service 352 may be configured for execution on a cloud computing platform, on a user device (e.g., user device 304), or on an IoT device (e.g., any of IoT devices 306, 308, 310, 312). IoT applications made available for distribution by digital marketplace service 352 may also be configured for execution in a distributed manner across a plurality of devices to facilitate one or more of improved performance, resource sharing, redundancy, or resiliency. For example, an IoT application may be configured for execution in a distributed manner across a plurality of IoT devices, across a plurality of user devices, or across a combination of IoT device(s), user device(s) and cloud servers. A given IoT application made available for distribution by digital marketplace service 352 may also be represented by a plurality of different codebases or builds, each of which may be configured for execution on a different set of host device(s), thereby enabling the IoT application to be selectively installed in a variety of different configurations.

As will be discussed below in reference to IoT application development platform 370, IoT applications made available for distribution by digital marketplace service 352 may be built on and include application programming interfaces (APIs) that translate between relatively high-level operations associated with events, generic IoT device functions, or generic IoT device types and relatively low-level operations associated with specific IoT devices or IoT device types. Such APIs may be made available to IoT application developers to enable them to easily code IoT applications that can be utilized with a wide variety of different IoT devices or IoT device types.

As will also be discussed below in reference to IoT application development platform 370, IoT applications made available for distribution by digital marketplace service 352 may also be built on and include APIs for third party services to enable such third party services to be integrated into the IoT applications. For example, IoT applications made available for distribution by digital marketplace service 352 may incorporate APIs associated with social media platform services, microblogging services, video sharing services, email services, streaming media services, digital assistant services, or the like, so that features of these services may be incorporated into the IoT applications. Some straightforward and non-limiting examples of IoT applications that may incorporate third party services include an IoT application that turns on a smart lightbulb or turns a smart lightbulb a particular color in response to a message being received via a social media platform or an IoT application that activates a smart doorbell when an email is received by an email service.

Digital marketplace service 352 may provide IoT device users with access to a wide variety of IoT applications that extend far beyond the manufacturer-supplied software typically provided with an IoT device. For example, digital marketplace service 352 may enable IoT device users to access IoT applications developed by IoT device manufacturers, third parties, independent developers, power users, or the like. Such parties may utilize an IoT application development platform, such as IoT application development platform 370, to develop such IoT applications and to submit them to IoT application store 350 for distribution. Digital marketplace service 352 may also provide IoT device users with access to IoT applications that can extend the capabilities of their IoT devices beyond an original set of capabilities supported by those IoT devices at the time of purchase. Such IoT applications may, for example, enable an end user to experiment or creatively exploit the features of an IoT device in a manner not contemplated by the IoT device manufacturer. Furthermore, such IoT applications may enable diverse IoT devices (e.g., IoT devices of different types and/or manufactured by different companies) to work together to perform useful functions that each IoT device acting alone could not possibly perform.

Various example IoT applications that may be made available for distribution by digital marketplace service 352 will now be described. These example IoT applications are presented herein by way of example only and are by no means limiting. Persons skilled in the relevant art(s) will readily appreciate that a virtually unlimited variety of IoT applications may be made for distribution by digital marketplace service 352.

An example IoT application that may be distributed by digital marketplace service 352 may control a color, a brightness, and/or an on/off state of various smart lightbulbs in a premises in accordance with a Christmas theme, a Halloween theme, or other theme.

Another example IoT application that may be distributed by digital marketplace service 352 may comprise a music visualizer application that controls a color, a brightness, and/or an on/off state of various smart lightbulbs in a premises over time in a manner that is synchronized with a song playing in a premises and captured by one or more microphones.

Another example IoT application that may be distributed by digital marketplace service 352 may comprise a "light stream" application that controls a color, a brightness, and/or an on/off state of various smart lightbulbs over time in a manner that is synchronized with audio content and/or video content being streamed to a media playback device (a "light stream"). In further accordance with this example, the IoT application may include information that specifies how to carry out the display at the time of installation, may retrieve such information from IoT application store 350, or such information may be streamed along with the audio content and/or video content and provided to the IoT application at the time of playback.

Another example IoT application that may be distributed by digital marketplace service 352 may utilize a machine learning (ML) model (e.g., a visual ML classifier) to detect deer (or other animals, people or objects) based on video images captured by a camera (e.g., an outdoor camera) of an IoT device.

Another example IoT application that may be distributed by digital marketplace service 352 may utilize an ML model (e.g., an audio ML classifier) to detect a baby crying (or other sounds) based on audio captured by a microphone of an IoT device.

Another example IoT application that may be distributed by digital marketplace service 352 may enable a smart doorbell to play custom doorbell chimes.

Another example IoT application that may be distributed by digital marketplace service 352 may utilize generative artificial intelligence (AI) to control IoT devices to produce various effects (e.g., to control a set of smart lightbulbs to produce interesting patterns). Such an IoT application may enable a user to provide input (e.g., natural language input) to guide the generative AI. For example, such an IoT application may use a large language model (LLM) to interpret user input (e.g., natural language input) to guide the generative AI.

Another example IoT application that may be distributed by digital marketplace service 352 may enable a user to set up automation rules that govern how the IoT application operates in response to certain inputs and/or to generate certain outputs. Such an automation rule may specify, for example, that all smart door locks should be engaged when a smart security system detects that a homeowner is leaving the house. Such an IoT application may use an LLM to interpret user input (e.g., natural language input) to determine the automation rules. Thus, in further accordance with the previous example, the user may state "lock the doors when I leave" and the IoT application may use an LLM to determine the aforementioned automation rule based on such user input.

IoT applications distributed by digital marketplace service 352 may include stand-alone applications as well as plug-in applications that add specific features to an existing IoT application. Digital marketplace service 352 may also make custom configurations for certain IoT applications available to users. For example, a user may create a custom configuration for an installed instance of an IoT application and digital marketplace service 352 may provide a UI (e.g., digital marketplace UI 316) via which the user may export the custom configuration to digital marketplace service 352 to be shared with other users. The custom configurations may be provided free of charge to select users or to all users, or may be made available for purchase by other users. A revenue sharing model may be used to compensate a user that created the custom configuration as well as an entity that operates IoT application store 350.

IoT application store 350 may further comprise a smart installation service 354. Smart installation service 354 may operate to automatically install an IoT application after a user selects such IoT application for installation through interaction with digital marketplace service 352. Although smart installation service 354 is shown as part of IoT application store 350 in FIG. 3, in an alternate implementation, smart installation service 354 may execute on user device 304 (e.g., as part of IoT application manager 314), or some other device within premises 302. A user may interact with smart installation service 354 via a UI associated therewith. Such UI may comprise, for example, part of digital marketplace UI 316 or IoT application manager 314.

Smart installation service 354 may operate to automatically determine one or more target devices for installation of a selected IoT application and then install an instance of the selected IoT application to such target device(s). Smart installation service 354 may automatically install an instance of the IoT application to a cloud computing platform, a user device, or on an IoT device. For example, as shown in FIG. 3, smart installation service 354 may install an instance of IoT application 320 to a cloud computing platform, as part of cloud deployments 362, to user device 304, or to IoT device 306. Smart installation service 354 may also automatically install an instance of an IoT application across a plurality of devices for distributed execution thereof to facilitate one or more of improved performance, resource sharing, redundancy, or resiliency. For example, smart installation service 354 may install an instance of IoT application 320 across a plurality of IoT devices (e.g., IoT devices 306, 308, 310, 312), a plurality of user devices (e.g., a plurality of user devices 304), or a combination or sub-combination of IoT device(s), user device(s) and cloud servers for distributed execution thereof.

As previously noted, a given IoT application made available for distribution by digital marketplace service 352 may be represented by a plurality of different codebases or builds or, each of which may be configured for execution on a different set of host device(s). Smart installation service 354 may utilize such codebases or builds to selectively install the IoT application in a variety of different configurations.

Smart installation service 354 may take into account a variety of factors associated with each eligible host (e.g., cloud, user device, IoT device) in determining where to install an IoT application. For example, smart installation service 354 may consider, for each eligible host: available processing capability, available storage, available power, type and/or quality of network connection, or the like. Smart installation service 354 may also consider factors associated with the IoT application in determining whether to install the IoT application, such as the processing requirements of the IoT application, size of the IoT application, power requirements of the IoT application, input/output requirements of the IoT application, which IoT device(s) the IoT application controls or otherwise interacts with, or the like.

Smart installation service 354 may automatically determine where to install an IoT application without any input from the user, thereby simplifying the installation process for the user. Alternatively or additionally, smart installation service 354 may enable a user to select from among a plurality of eligible installation locations or configurations. Smart installation service 354 may enable a user to select between a "normal" installation mode, in which smart installation service 354 automatically determines where to install the IoT application, and an "expert" installation mode, in which the user selects the target installation location(s).

Smart installation service 354 may also determine where to install an IoT application based on preferences specified by the user. Such preferences may be specified by the user as part of the installation process, as part of registering with IoT application store 350, or at any other suitable time or via any other suitable channel. For example, if a user specifies that the IoT application should be able to run without an Internet connection, then smart installation service 354 may determine that the IoT application should not be installed to the cloud.

When installing an IoT application, smart installation service 354 may determine one or more inputs of the IoT application, one or more outputs of the IoT application, and then map or assign each such input and each output to one or more IoT devices in a set of IoT devices associated with the user. For example, as will be discussed below in reference to the description of IoT application development platform 370, an IoT application input or output may be defined in terms of an event that can mapped to one or more specific IoT devices, a generic IoT device function that can be mapped to one or more specific IoT devices, or a generic IoT device type that can be mapped to a specific IoT device. For example, a baby monitoring IoT application may define an event "baby crying" as an input, and an event "notify user" as an output, and each of these events can be mapped to one or more IoT devices. As another example, a music visualizer IoT application may define an audio capture function as an input (e.g., so that music being played in a premises can be captured) and a visualization function as an output (e.g., for displaying a light show that varies based on the music), and each such input and output can be mapped to one or more IoT devices.

Smart installation service 354 may map the input(s) and/or output(s) of an IoT application to a corresponding IoT device in a set of IoT devices associated with a user based on user input. For example, smart installation service 354 may automatically determine which of the IoT devices associated with the user can provide a particular input or produce a particular output, and then prompt the user to select from among those devices for providing the particular input or producing the particular output. For example, if the input is an audio capture function associated with a music visualization IoT application, smart installation service 354 may prompt the user to select from among a set of IoT devices, each of which is capable of capturing audio (e.g., each of which includes a microphone). If only one IoT device is capable of providing a particular input or producing a particular output, smart installation service may automatically select that device on behalf of the user or may ask the user to confirm the mapping of the input/output to the IoT device.

Smart installation service 354 may present information to a user associated with each possible IoT device mapping to facilitate the selection process. For example, smart installation service 354 may inform the user how the mapping of a particular IoT device to a particular input or output of the IoT application may impact a performance of the IoT application. Smart installation service 354 may also inform the user how using certain combinations of IoT devices for inputs and/or outputs of the IoT application may impact a performance of the application. The user may beneficially use such information to assign the input(s) and/or output(s) of the IoT application to IoT device(s) that will provide the best performance.

Smart installation service 354 may identify one or more IoT devices that are not associated with the user (e.g., are not owned by the user) but that, if used to provide an input or produce an output of the IoT application, would improve performance of the IoT application. Smart installation service 354 may present information about such IoT device(s) to the user as part of the installation and/or mapping process and may also include information indicating a degree to which performance of the IoT application would be improved if the user utilized such IoT device(s). Smart installation service 354 may also provide the user with a means to purchase or otherwise obtain such IoT device(s). For example, smart installation service 354 may present the user with a link to digital marketplace service 352 that the user may utilize to purchase or otherwise obtain such IoT device(s). Alternatively, smart installation service 354 may provide its own UI for purchasing or obtaining such IoT device(s).

Smart installation service 354 may enable the user to select from among a variety of different device types for performing certain functions associated with the IoT application, including both smart home devices and other device types. For example, smart installation service 354 may enable the user to select a microphone of a remote control associated with a media device (e.g., microphone 112 of remote control 110 associated with media device 106) as an audio input for an IoT application. Likewise, smart installation service 354 may enable the user to select a speaker associated with a television as an audio output for an IoT application. Smart installation service 354 may enable the user to select from among any number of IoT devices in premises 302 for interaction with an IoT application, provided that the installed instance of the IoT application can establish a direct or indirect communication link to such devices (e.g., to obtain input therefrom or provide output thereto).

Smart installation service 354 may automatically assign IoT application inputs and outputs to IoT devices in a set of IoT devices associated with the user without any input from the user. Smart installation service 354 may automatically assign the IoT application inputs and outputs to an initial or default set of IoT devices associated with the user and then provide the user with an opportunity to change the assignments.

To aid in performing the aforementioned mapping/assignment function, smart installation service 354 may be able to access information about a set of IoT devices associated with the user. For example, smart installation service 354 may be able to access information about IoT devices associated with a user in premises 302, including IoT devices 306, 308, 310 and 312. Such information may include, for example and without limitation, a device type, a device manufacturer, a device model, a device software/firmware version, a description of device capabilities, a description of device sensor types, a description of device actuator types, or the like, associated with each IoT device in the set of IoT devices associated with the user. Digital marketplace service 352 may utilize such information to identify eligible IoT devices for assignment of an IoT application input or output.

Smart installation service 354 may obtain such information about the IoT devices associated with the user in a variety of ways. For example, smart installation service 354 may prompt the user to provide information about the IoT devices. As another example, smart installation service 354 may be configured to determine (e.g., automatically or through user input) a device identifier (ID) associated with each IoT device of the user. Smart installation service 354 may then access a database (e.g., maintained as part of IoT application store 350) that maps device IDs to device features to determine a set of features associated with each IoT device.

As another example, smart installation service 354 may obtain information about the IoT devices from the IoT devices themselves utilizing a device discovery protocol supported by the IoT devices and smart installation service 354. For example, such device discovery protocol may enable smart installation service 354 to query the IoT devices for such information or enable the IoT devices to submit such information via a registration process (e.g., at a time of device installation). In further accordance with this example, a bridging device (e.g., an IoT device hub or the like) may be used to provide information to smart installation service 354 about IoT devices that do not support or are not capable of supporting the device discovery protocol. Such device discovery protocol may be implemented using an API that represents diverse IoT devices using a common schema. For example, such schema may define a device type "smart white lightbulb" with operational states "on", "off" and "brightness" and a device type "smart color lightbulb" with operational states "on", "off", "brightness" and "color". In accordance with such an implementation, very different device types (e.g., TVs and lightbulbs) may nevertheless share a common functionality (e.g., displaying a color) and thus the same function could be mapped to very different device types.

Smart installation service 354 may also be able to access a two-dimensional (2D) or three-dimensional (3D) map of the IoT devices associated with the user, wherein the map may represent the premises in which the IoT devices are installed or otherwise located. Such map may comprise information about each of the IoT devices as well as a corresponding map location (e.g., one or more map coordinates) for each IoT device. An example system and method for generating such a map is described in commonly-owned, co-pending U.S. patent application Ser. No. 18/141,120, filed Apr. 28, 2023, and entitled "Map Generator for Map-Based Device Management." Smart installation service 354 may advantageously leverage such positional information about the IoT devices when assigning IoT application inputs and/or outputs. For example, smart installation service 354 may utilize such information in assigning inputs and outputs to IoT devices for IoT applications that have a positional requirement with respect to those inputs and outputs (e.g., a security application that requires video inputs from different locations throughout a home to achieve a desired coverage area, a smart lightbulb application that illuminates smart lightbulbs in an order determined by their physical location to achieve a desired effect (e.g., a "wave"), a music visualizer application that requires video outputs to be in the same area or room as an audio input, or a baby monitor application that requires an audio input proximate to a baby's room).

Thus, in accordance with the foregoing, each IoT device associated with a user (e.g., installed in a premises associated with the user) may have a known or discoverable (e.g., through APIs) set of properties or features that can enable smart installation service 354 to determine whether a given IoT application can run on the user's set of IoT devices and to map the IoT application inputs and outputs to the set of IoT devices.

Smart installation service 354 may also operate to automatically determine the set of inputs and outputs associated with each IoT application that is eligible for distribution by digital marketplace service 352. Smart installation service 354 may automatically determine the set of inputs and outputs in a variety of ways. For example, smart installation service 354 may determine the set of inputs and outputs associated with an IoT application based on metadata provided by a developer or publisher of the IoT application. As another example, smart installation service 354 may automatically determine the set of inputs and outputs associated with an IoT application by performing automated (e.g., static and/or dynamic) code analysis on the IoT application. Still other methods may be used by smart installation service 354 to determine the set of inputs and outputs associated with an IoT application.

Smart installation service 354 may operate to map an input or output of an IoT application to an IoT device that provides a feature set that matches the IoT application's requirements. However, when no such IoT device is available, smart installation service 354 may operate to map the input or output of the IoT application to an IoT device that provides some but not all of the features required by the IoT application, so that the IoT application may still be installed and executed, although at a reduced level of performance. For example, an IoT application that is intended to create a light show using colored light bulbs may still be executed using white light bulbs (e.g., through turning the bulbs on and off and/or adjusting the brightness thereof) and thus smart installation service 354 may map the outputs of such IoT application to a set of white lightbulbs when no color lightbulbs are available. As part of this process, smart installation service 354 may apprise the user of the shortcomings associated with their current set of IoT devices and provide the user with a means for purchasing or otherwise obtaining more suitable IoT devices. For example, smart installation service 354 may present the user with a link to digital marketplace service 352 that the user may utilize to purchase or otherwise obtain such IoT device(s). Alternatively, smart installation service 354 may provide its own UI for purchasing or obtaining such IoT device(s).

Smart installation service 354 may determine that the set of IoT devices associated with the user is not sufficient to support each input and output associated with an IoT application selected for installation. In such a scenario, smart installation service 354 may nevertheless install the IoT application with one or more missing inputs or outputs, if smart installation service 354 determines that the IoT application can still perform at an acceptable level. For example, an IoT application that is intended to create a light show using 48 colored lightbulbs may still be executed using 32 colored lightbulbs and produce an acceptable effect and thus smart installation service 354 may install the IoT application even though there are less than an ideal number of output devices. As part of this process, smart installation service 354 may apprise the user of the shortcomings associated with their current set of IoT devices and provide the user with a means for purchasing or otherwise obtaining additional IoT devices. For example, smart installation service 354 may present the user with a link to digital marketplace service 352 that the user may utilize to purchase or otherwise obtain such additional IoT device(s). Alternatively, smart installation service 354 may provide its own UI for purchasing or obtaining such additional IoT device(s).

Smart installation service 354 may also alert a user to the fact that an IoT application selected by the user will perform sub-optimally with a current set of IoT devices associated with the user and recommend that the user add or upgrade IoT devices for a better performance. In such a case, smart installation service 354 may provide the user with a means to purchase such additional or upgraded IoT devices (e.g., a link to digital marketplace service 352 or a UI provided by smart installation service 354 that the user may utilize to purchase or otherwise obtain such additional or upgraded IoT devices) or may automatically purchase, order or obtain such additional or upgraded IoT devices on behalf of the user.

To perform this function, smart installation service 354 may be able to access data that indicates whether and/or how a selected IoT application will perform with different sets of IoT devices and IoT device configurations. Such data may be obtained by smart installation service 354 in a variety of ways. For example, smart installation service 354 may obtain such data as part of metadata provided by a developer or publisher of the IoT application or by an entity that operates IoT application store 350 (e.g., who may obtain the data through testing of the IoT application with different sets of IoT devices and IoT device configurations). As another example, such data may be derived from telemetry generated by installed instances of the IoT application. As yet another example, such data may be based on explicit or implicit user feedback collected regarding the IoT application. An example of explicit user feedback may comprise a rating and/or review about the IoT application submitted by a user to digital marketplace service 352 (e.g., via digital marketplace UI 316). An example of implicit user feedback may comprise user-specific IoT application usage statistics.

The aforementioned data that indicates how a selected IoT application will perform with different sets of IoT devices and IoT device configurations may be used to train a machine learning (ML) model. Smart installation service 354 may then utilize such ML model to predict how inputs/outputs of a selected IoT application should be mapped to a set of IoT devices associated with a user to provide the best possible performance. This prediction may then be used to automatically map the inputs/outputs to the IoT devices or to suggest such a mapping to the user.

As previously noted, digital marketplace service 352 may enable a first user to share or sell a custom configuration associated with an IoT application. When a second user selects the custom configuration via digital marketplace service 352, smart installation service 354 may operate to apply the selected custom configuration to the second user's installation of the IoT application. If the first user and the second user have the same set of IoT devices, the application of the selected custom configuration to the second user's installation may be relatively straightforward. However, if the first user and the second user each have a different set of IoT devices, smart installation service 354 may automatically modify the custom configuration to account for differences in a type and/or number of IoT devices associated with each user's setup. Smart installation service 354 may utilize a process (e.g., an ML model) that modifies the configuration in a manner that is deemed most likely to produce a similar result or level of performance as the original configuration but that accords with the constraints of the second user's installation. For example, smart installation service 354 may modify a custom configuration of an array of 200 smart color lightbulbs that produces an image of a nation's flag to generate a custom configuration of an array of 100 smart color lightbulbs that produces a lower resolution image of the same flag. Smart installation service 354 may also modify the configuration to account for different spatial positioning and orientation of IoT devices in cases where the position/orientation of IoT devices influences IoT application performance.

Smart installation service 354 may also determine that the application of a selected custom configuration to the second user's installation will not be successful unless the second user adds or upgrades one or more IoT devices. In such a scenario, smart installation service 354 may provide the second user with a means to purchase such additional or upgraded IoT devices (e.g., a link to digital marketplace service 352 or a UI provided by smart installation service 354 that the user may utilize to purchase or otherwise obtain such additional or upgraded IoT devices) or may automatically purchase, order or obtain such additional or upgraded IoT devices on behalf of the user.

IoT application store 350 may further comprise an automatic updating service 356. Automatic updating service 356 may operate to update an installed instance of an IoT application or a configuration thereof. Although automatic updating service 356 is shown as part of IoT application store 350 in FIG. 3, in an alternate implementation, automatic updating service 356 may execute on user device 304 (e.g., as part of IoT application manager 314), or some other device within premises 302. A user may interact with automatic updating service 356 via a UI associated therewith. Such UI may comprise, for example, part of digital marketplace UI 316 or IoT application manager 314.

Automatic updating service 356 may be configured to run on a periodic or intermittent basis and/or in response to one or more events. For example, automatic updating service 356 may be configured to execute based on a user invocation thereof (e.g., via user interaction with IoT application management tools 318 of IoT application manager 314), based on an availability of a software update associated with the installed IoT application, based on application of a software or firmware update to an IoT device that is controlled by or otherwise interacts with the installed IoT application, based on a change in state or unavailability of a host device (e.g., user device, IoT device, cloud computing platform or server)

upon which the IoT application is installed, based on a change in state or unavailability of an IoT device that the installed IoT application is configured to control or otherwise interact with, and/or based on the addition of new IoT devices or host devices to a premises (e.g., premises 302). However, these are only some examples and automatic updating service 356 may be configured to execute based on other events as well.

Automatic updating service 356 may determine that an event has occurred (e.g., an event that renders updating the installed IoT application useful or beneficial), and then prompt the user to select whether or not an automatic update of the installed IoT application should be performed (e.g., immediately or at a later time) based on the occurrence of the event. For example, automatic updating service 356 may prompt the user to select whether or not an automatic update of the installed IoT application should be performed in response to determining (i) that a software update associated with the installed IoT application is available, (ii) that a software or firmware upgrade has been applied to an IoT device that is controlled by or otherwise interacts with the installed IoT application, (iii) that a host device (e.g., user device, IoT device, cloud computing platform or server) upon which the IoT application is installed has undergone a change of state or is unavailable, (iv) that an IoT device that the installed IoT application is configured to control or otherwise interact with has undergone a state of change or is unavailable, and/or (v) that a new IoT device or host device has been added to a premises (e.g., premises 302). However, these are only some examples and automatic updating service 356 may be configured to prompt the user to select whether or not an automatic update of the installed IoT application should be performed in response to other determinations as well.

Automatic updating service 356 may be configured to update an installed IoT application by applying a software modification (e.g., patch, update, upgrade, support pack, hotfix, or the like) to the installed IoT application.

Automatic updating service 356 may also be configured to update an installed IoT application by uninstalling the IoT application from a first set of host devices and reinstalling the IoT application on a second set of host devices. For example, if one or more host devices in the first set of host devices is underperforming, resource constrained (e.g., processor, storage, or power constrained), or unavailable, automatic updating service 356 may uninstall the IoT application therefrom and reinstall it on the second set of host devices. This may entail, by way of example only and without limitation, uninstalling an IoT application from the cloud and reinstalling it on one or more user devices or IoT devices, uninstalling an IoT application from one or more user devices or IoT devices and reinstalling it on the cloud, uninstalling an IoT application from one or more user devices and reinstalling it on one or more IoT devices, or uninstalling an IoT application from one or more IoT devices and reinstalling it on one or more user devices.

Automatic updating service 356 may also be configured to update an installed IoT application by reassigning or remapping an input or output thereof from a first IoT device to a second IoT device. For example, automatic updating service 356 may determine that a change has been made to a set of IoT devices associated with the user. In further accordance with this example, automatic updating service 356 may determine that a first IoT device that was previously assigned to an input or output of the installed IoT application is no longer functioning or is otherwise unavailable (e.g. the user may have uninstalled the first IoT device, the first IoT device may have been powered down or lost power, or the first IoT device may have lost network connectivity). In response to at least this determination, automatic updating service 356 may selectively assign a second IoT device in the set of IoT devices associated with the user to the input or output and configure the installed IoT application to obtain the input or provide the output to the second IoT device. Thus, automatic updating service 356 may automatically "self heal" the deployment of the IoT application when an associated IoT device is no longer functioning or is otherwise unavailable.

Automatic updating service 356 may alternatively present the user with a list of eligible replacement IoT devices for the first IoT device from among the set of IoT devices and allow the user to select the replacement IoT device therefrom. Still further, automatic updating service 356 may enable the user to obtain (e.g., purchase) a new IoT device from which the input can be obtained or to which the output can be provided. For example, automatic updating service 356 may provide the user with a means to purchase such new IoT device (e.g., a link to digital marketplace service 352 or a UI provided by automatic updating service 356 that the user may utilize to purchase or otherwise obtain the new IoT device) or may automatically purchase, order or obtain the new IoT device on behalf of the user. Thus, automatic updating service 356 may enable a user to easily replace malfunctioning IoT devices upon which their IoT applications depend.

As another example, automatic updating service 356 may determine that a new IoT device has been added to the set of IoT devices associated with the user and that the new IoT device may be mapped to an input or output of an installed IoT application. In such a scenario, automatic updating service 356 may automatically re-map an input/output assigned from an older IoT device to the new IoT device, or map a currently unassigned input/output to the new IoT device. Automatic updating service 356 may be configured to perform such remapping or mapping, for example, in response to determining that such remapping or mapping will result in an improved performance of the IoT application. Automatic updating service 356 may also enable the user to select whether such remapping or mapping should be carried out.

To enable automatic updating service 356 to remap inputs/outputs of an IoT application from a first IoT device to a second IoT device as discussed above, or to map unassigned inputs/output of an IoT application to a new IoT device as discussed above, automatic updating service 356 may be configured to access information concerning each IoT device that may include a set of properties or features associated therewith. A more expanded description of such information and how it may be obtained was provided above in reference to smart installation service 354, and thus such description will not be repeated here for the sake of brevity.

Automatic updating service 356 may be able to access a continuously updated 2D or 3D map of a set of IoT devices associated with a user. As previously noted, an example system and method for generating such a map is described in commonly-owned, co-pending U.S. patent application Ser. No. 18/141,120, filed Apr. 28, 2023, and entitled "Map Generator for Map-Based Device Management." In such a case, automatic updating service 356 may be configured to update an installed IoT application based on detecting a change in location or orientation of an IoT device that is controlled by or otherwise interacts with the IoT application. This may be particularly beneficial in cases in which the location or orientation of the IoT device is important to or otherwise affects the performance of the IoT application. For example, if the IoT application is a baby monitor that depends upon an audio input located relatively close to a baby's room, and the IoT device that provides such audio input is moved to a different location in a premises, then automatic updating service 356 may operate to switch the audio input to a new IoT device that is now closer to the baby's room. As another example, if the IoT application is a home security application that depends upon a video input that provides a view of a front doorstep and the IoT device that provides such video input is moved such that it can no longer provide the required view, then automatic updating service 356 may operate to switch to a different IoT device to provide the requisite video input, if available. Automatic updating service 356 may also notify the user if a change of location or orientation of an IoT device has affected the performance of an IoT application. Automatic updating service 356 may also prompt the user to confirm a suggested change of input or output before implementing the same.

IoT application store 350 may further comprise a virtual deployment service 358. Virtual deployment service 358 may enable a user to deploy an instance of a selected IoT application (e.g., IoT application 320) to a virtual environment 364 in which the instance of the selected IoT application may interact with one or more simulated IoT devices. Virtual environment 364 may be executed by one or more servers of a cloud computing platform, as represented by cloud deployments 362 in FIG. 3, although virtual environment 364 may be hosted on other devices as well (e.g., user device 304). A user may interact with virtual deployment service 358 via a UI associated therewith. Such UI may comprise, for example, part of digital marketplace UI 316 or IoT application manager 314.

Virtual deployment service 358 may enable a user to deploy to virtual environment 364 an IoT application that the user has selected via interaction with digital marketplace service 352, but has not yet purchased or installed to any physical devices associated with the user. This may enable the user to observe the performance of the selected IoT application, determine the suitability of the selected IoT application for installation with the user's IoT devices, and/or test various configurations of the IoT application without first purchasing the IoT application or installing it on the physical devices associated with the user.

For example, virtual deployment service 358 may enable a user to configure and execute an instance of a selected IoT application in virtual environment 364 prior to purchasing the IoT application or installing the selected IoT application for use with his/her own physical IoT devices. Then, when the IoT application is configured to the user's satisfaction and running successfully in virtual environment 364, the user may purchase the IoT application and/or initiate installation thereof for use with his/her own physical IoT devices. Smart installation service 354 may then install the IoT application to one or more physical devices associated with the user in a manner described above and transfer the user-created configuration of the instance of the IoT application installed in virtual environment 364 to the real-world installation of the IoT application.

Virtual deployment service 358 may also enable a user to deploy to virtual environment 364 an instance of an IoT application that the user has already installed to one or more physical devices associated therewith. This feature may enable the user to test various changes to the IoT application after installation thereof in virtual environment 364 without disrupting or otherwise impacting the current (physical) setup.

As noted above, virtual deployment service 358 may enable an instance of an IoT application deployed to virtual environment 364 to interact with one or more simulated IoT devices. The simulated IoT devices may represent a set of IoT devices currently owned by the user. For example, virtual deployment service 358 may be able to collect information about the user's IoT devices using any of the techniques previously described in reference to smart installation service 354 and utilize such information to instantiate software simulations of those IoT devices. In further accordance with such an implementation, virtual deployment service 358 may automatically map the IoT application inputs and outputs to the simulated IoT devices using techniques described above in reference to smart installation service 354.

Alternatively, virtual deployment service 358 may instantiate the software simulations of the user's IoT devices based on user-provided information about those IoT devices. For example, virtual deployment service 358 may present the user with a GUI that enables the user to select his/her IoT devices from among a set of IoT devices displayed in the GUI, and then create simulated IoT devices based on the user's selections. The simulated IoT devices may represent generic IoT device types or specific real world brands/models of IoT devices. The simulated IoT devices may also represent IoT devices that the user does not currently own but could acquire in the future. Each simulated IoT device may be configured to interact with the instance of the IoT application installed in virtual environment 364 in a manner similar to how a corresponding real world (physical or hardware-based) version of the IoT device would interact with the IoT application.

Virtual deployment service 358 may enable the user to add any number of simulated IoT devices to a virtual deployment. For example, virtual deployment service 358 may enable a user to deploy a music visualizer IoT application (e.g., an IoT application that changes a color, a brightness, and/or an on/off state of various smart lightbulbs over time in a manner that is synchronized with or otherwise based on a song) to virtual environment 364 and then add any number of simulated smart lightbulbs to the deployment to visualize how the IoT application controls the virtual smart lightbulbs over time based on a particular song.

Virtual deployment service 358 may assist a user in obtaining or purchasing real-world versions of simulated IoT devices that the user has added to a virtual deployment but that the user does not currently own. For example, virtual deployment service 358 may automatically determine a cost associated with obtaining such IoT devices and present the cost to the user. Furthermore, virtual deployment service 358 may provide a UI via which the user can order some or all of the IoT devices that the user has added to a virtual deployment but that they do not currently own.

In an implementation in which virtual deployment service 358 is able to access a 2D or 3D map of the real-world location of the user's IoT devices, virtual deployment service 358 may position the simulated IoT devices in simulated 2D or 3D space in a manner that accords with or is otherwise based on their current real-world location. Virtual deployment service 358 may further enable the user to adjust the location and/or orientation of the simulated IoT devices in the simulated 2D or 3D space as part of the simulation. Thus, for example, the user may rearrange the location of various simulated smart lightbulbs in a simulated 3D space as part of testing a music visualizer IoT application.

Virtual deployment service 358 may further enable a user to connect an instance of a selected IoT application that is deployed to virtual environment 364 to one or more physical IoT devices associated with the user to enable the user to observe how the IoT application performs with those physical IoT devices. Thus, the user may create a hybrid deployment in which some of the IoT application inputs or outputs are assigned to physical IoT devices associated with the user and other ones of the IoT application inputs or outputs are assigned to simulated IoT devices. The user may create such a hybrid deployment, for example, to determine how an IoT application would perform if the user's existing network of physical IoT devices were extended to include one or more additional IoT devices (wherein the additional IoT device(s) may be represented as simulated IoT device(s)) or to determine how an IoT application would perform with the user's existing network of physical devices if one or more of the physical IoT devices were upgraded (wherein the upgraded IoT device(s) may be represented as simulated IoT device(s)).

IoT application store 350 may further comprise an IoT application submission service 360. IoT application submission service 360 may enable a user (e.g., a software developer) to submit an IoT application for distribution via IoT application store 350. For example, as will be discussed below in reference to FIG. 4, IoT application submission service 360 may accept an upload of an IoT application from an IoT application submission client 410 that comprises part of IoT application development platform 370. The IoT application that is submitted to IoT application submission service 360 may comprise a plurality of different codebases or builds, each of which may be configured for execution on a different set of host device(s), thereby enabling the IoT application to be selectively installed in a variety of different configurations.

IoT application submission service 360 may further provide testing services that enable a user to test an IoT application under development. IoT application submission service 360 may additionally require a user to certify that an IoT application has met certain testing requirements before the IoT application will be eligible for distribution. IoT application submission service 360 may also require a submitted IoT application to undergo a manual and/or automatic review in order to be eligible for distribution.

IoT application submission service 360 may enable (and potentially require) a user to provide metadata about an IoT application being submitted. As previously noted, such metadata include a set of inputs and outputs associated with the IoT application and/or data that indicates whether and/or how the IoT application will perform with different sets of IoT devices and IoT device configurations, among other information.

Developers of IoT applications that are submitted to and distributed by IoT application store 350 may receive revenue from an entity that owns and operates IoT application store 350. For example, in an implementation in which IoT applications are offered for purchase by IoT application store 350, a developer of an IoT application may be paid a share of a payment or subscription fee associated with each instance of the IoT application distributed by IoT application store 350. As another example, a developer of an IoT application may receive a payment from an IoT device manufacturer or seller each time a user purchases an IoT device made or sold thereby as part of a process of installing the IoT application through IoT application store 350. Such payment may be made in money, digital credits, or the like.

It is to be understood that, although only a single IoT application store 350 is shown in FIG. 3, system 300 may include multiple instances of IoT application store 350 that may be concurrently executed to distribute IoT applications. For example, different instances of IoT application store 350 may be concurrently executed for load balancing purposes, to provide redundancy and/or resiliency, to distribute IoT applications to different geographic regions or different organizations, or the like.

IoT Application Development Platform 370

Figure 4:
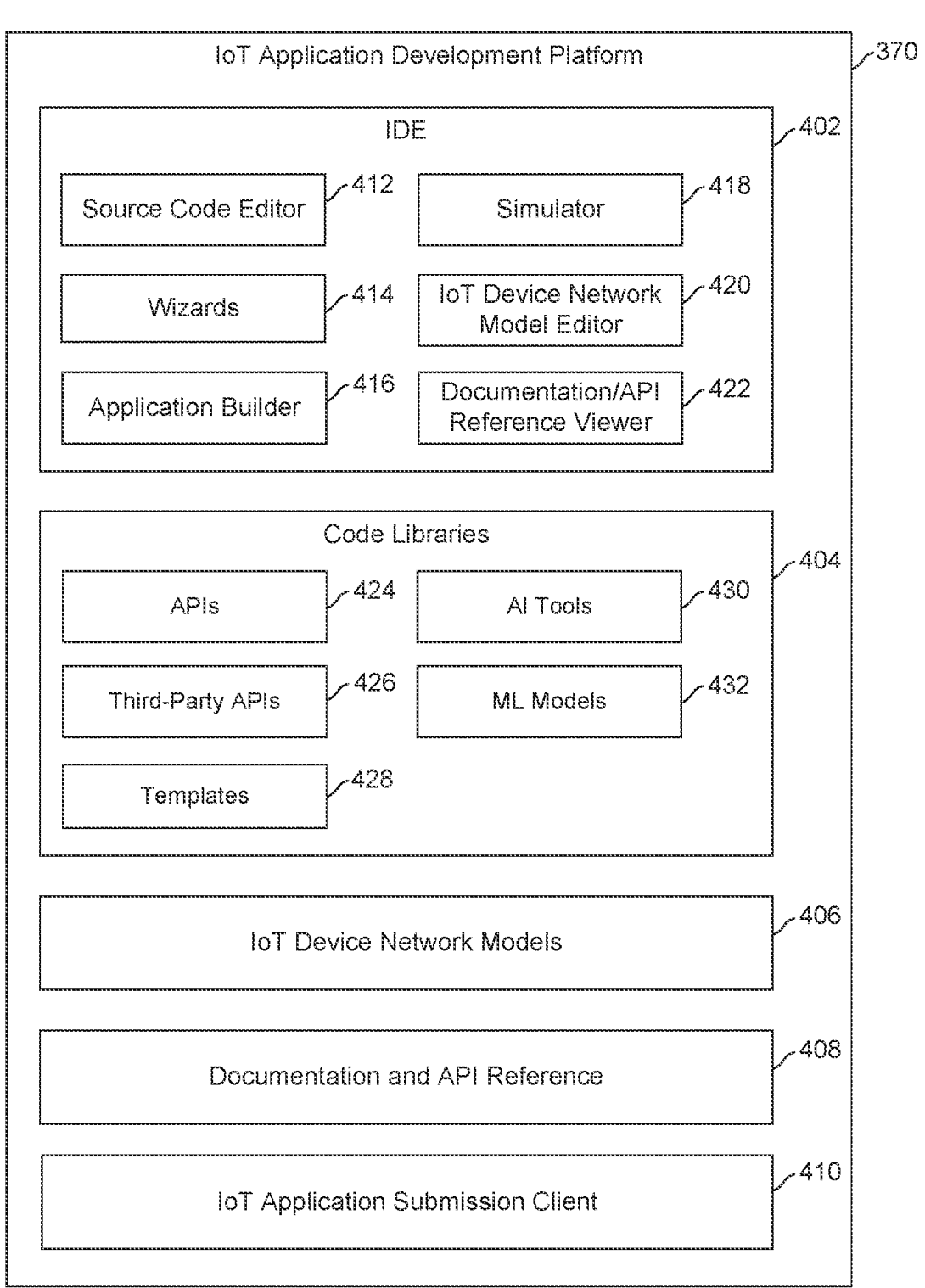
FIG. 4 illustrates a block diagram of a platform for developing an IoT application, according to some embodiments.

FIG. 4 illustrates a block diagram of IoT application development platform 370, according to some embodiments. IoT application development platform 370 may be implemented as processing logic that can comprise hardware (e.g., circuitry, dedicated logic, programmable logic, microcode, etc.), software (e.g., instructions executing on a processing device), or a combination thereof. IoT application development platform 370 may be implemented on one or more computing devices associated with a user (e.g., a software developer) that are remote from IoT application store 350 but communicatively connected thereto via one or more networks (e.g., via the Internet). Alternatively, IoT application development platform 370 may be implemented on one or more servers (e.g., of a cloud computing platform) and accessed via a suitable client (e.g., a web browser or other internet-enabled application). Still further, IoT application development platform 370 may be partially implemented on one or more computing devices associated with a user and partially implemented on one or more servers (e.g., of a cloud computing platform).

In FIG. 3, IoT application development platform 370 is shown as being separate from IoT application store 350. However, in an alternate implementation, some or all of the components of IoT application development platform may comprise part of IoT application store 350.

Some or all of the components of IoT application development platform 370 may be included within a software development kit (SDK) that a user may obtain (e.g., via download) from IoT application store 350, an online code repository, or other suitable data source. Such SDK may include, be accompanied by, or otherwise associated with an installer that, when executed on a computing device, causes the components of IoT application development platform 370 to be installed thereon. Installing the components of IoT application development platform 370 to a computing device may comprise decompressing a compressed representation of the components, decrypting an encrypted representation of the components, storing certain components to certain folders within a file system of the computing device, registering certain executable components with an operating system of the computing device, or the like.

As shown in FIG. 4, IoT application development platform 370 may include an integrated development environment (IDE) 402. IDE 402 may comprise one or more tools that enable a user of IoT application development platform 370 (e.g., a developer) to develop one or more IoT applications, such as IoT application 320. IDE 402 may comprise a source code editor 412, a set of wizards 414, an application builder 416, a simulator 418, an IoT device network model editor 420, and a documentation/API reference viewer 422. Each of these components of IDE 402 will now be described.

Source code editor 412 may comprise a component of IDE 402 that enables a user of IoT application development platform 370 to generate (e.g., write or edit) source code of an IoT application. Source code editor 412 may comprise a text editor that enables a user to generate source code through typing or otherwise entering text into a UI of the editor. Source code editor 412 may also comprise a visual editor that enables a user to generate source code by selecting, dragging and dropping, and/or interconnecting various visual representations of source code elements in a GUI. Source code editor 412 may also comprise a natural language processing model or other algorithm that is capable of generating source code based on natural language input from a user (e.g., via a UI prompt or microphone).

Source code editor 412 may enable a user to develop the source code of an IoT application by specifying one or more inputs, one or more processing steps (e.g., to be performed based on the input(s)), and one or more outputs (e.g., to be produced based on the processing step(s)). For example, in an embodiment in which source code editor 412 comprises a visual editor, a user may interact with a GUI to select visual elements representing inputs, processing steps, and outputs from a menu of such elements and drag and drop such elements to a workspace for inclusion within the source code. The manner by which the user interconnects such visual elements within the workspace may define a process flow of the source code. Furthermore, each visual element may expose configurable aspects of the source code represented thereby so that a user may easily customize the corresponding source code of the visual element.

Source code editor 412 may enable a user to generate the source code of an IoT application by defining an input of the IoT application in terms of an event and/or by defining an output of the IoT application in terms of an event. For example, source code editor 412 may enable a user to specify an event "baby crying" as an input of an IoT application and an event "notify user" as an output of the IoT application. Source code editor 412 may also enable the user to specify logic that acts upon the input to produce the output, such as: if "baby crying", then "notify user".

The aforementioned events need not be associated with any particular IoT devices at the time of application development. Rather, as discussed above in reference to IoT application store 350, smart installation service 354 may map each event to a suitable set of IoT devices during installation of the IoT application to a particular network of IoT devices (e.g., the network of IoT devices 306, 308, 310 and 312 in premises 302). For example, in a first network of IoT devices, the event "baby crying" may be mapped to a digital assistant that includes a microphone so as to capture the audio necessary to detect a baby crying, while in a second network of IoT devices, the event "baby crying" may be mapped to a security device that includes a microphone (e.g., a glass break detector) to capture such audio. As another example, in a first network of IoT devices, the event "notify user" may be mapped to a smart doorbell that can emit a special chime to notify a user that the baby is crying, while in a second network of IoT devices, the event "notify user" may be mapped to the aforementioned digital assistant so that the digital assistant may verbally notify the user. This feature can greatly simplify the development of the IoT application while also ensuring that the IoT application can be used in a wide variety of different IoT device networks.

IoT application development platform 370 may support any number of predefined event types and a user may incorporate such event types into source code being developed thereby using source code editor 412. By way of example and without limitation, predefined input event types may include "person on doorstep', "package on doorstep", "glass breaking", "dog barking", "fire", "sunrise", "sunset", "watching movie", "working from home", "sleeping", or the like, while predefined output event types may include "alert user", "alert authorities", "cool down home", "dim lights", "reduce noise", "lock down home", or the like. Predefined event types may be defined as part of APIs 424 that are included in code libraries 404 and incorporated by reference into source code. An API for a particular event may specify the types of IoT devices that may be used to implement the event as well as how the event may be detected or carried out. IoT application development platform 370 may also enable a user to define custom events by modifying existing event types or by generating entirely new event types.

Source code editor 412 may enable a user to specify any number of input events and/or any number of output events in association with an IoT application under development. For example, source code editor 412 may enable a user to specify a number of input events in parallel, such that an occurrence of any one of the input events will trigger a particular process step or output event. As another example, source code editor 412 may enable a user to specify a series of input events, such that all of the input events in the series must occur (optionally in a particular order) before a particular process step or output event will be triggered. In a visual editor implementation of source code editor 412, a user may create such parallel or serial arrangement of input events by arranging visual elements that represent such input events in a workspace of a GUI.

Source code editor 412 may enable a user to specify a machine learning (ML) model to be used in identifying or establishing an occurrence of an input event of an IoT application. For example, source code editor 412 may enable a user to specify an ML model for analyzing audio captured by an IoT application to detect a baby crying or an ML model for analyzing video captured by an IoT application to classify a person as a known person or an unknown person. In this regard, IoT application development platform 370 may include a set of ML models 432 as part of code libraries 404, and each such ML model in ML models 432 may be incorporated by reference into the source code of an IoT application under development. IoT application development platform 370 may further provide a facility by which a developer may train a particular ML model to be used in an IoT application. Furthermore, ML models incorporated into an IoT application may provide for a feature that enables an end user of the IoT application to train the ML model at runtime. For example, an end user of the IoT application may provide an audio clip of their own baby crying to train the ML model at runtime.

Source code editor 412 may also enable a user to generate the source code of an IoT application by defining an input of the IoT application in terms of a generic IoT device function and/or by defining an output of the IoT application in terms of a generic IoT device function. For example, source code editor 412 may enable a user developing a music visualizer IoT application to associate a generic IoT device function "capture audio" with an input of the application and a generic IoT device function "visualize music" with an output of the application.

The aforementioned generic IoT device functions need not be associated with any particular IoT devices at the time of application development. Rather, as discussed above in reference to IoT application store 350, smart installation service 354 may map each generic IoT device function to a suitable set of IoT devices during installation of the IoT application to a particular network of IoT devices (e.g., the network of IoT devices 306, 308, 310 and 312 in premises 302). For example, in a first network of IoT devices, the generic IoT device function "capture audio" may be mapped to a digital assistant that includes a microphone so as to capture the audio, while in a second network of IoT devices, the generic IoT device function "capture audio" may be mapped to a remote control for a media device that includes a microphone. As another example, in a first network of IoT devices, the generic IoT device function "visualize audio" may be mapped to an array of 500 smart lightbulbs, while in a second network of IoT devices, the generic IoT device function may be mapped to an array of 100 smart lightbulbs. This feature can also greatly simplify the development of the IoT application while also ensuring that the IoT application can be used in a wide variety of different IoT device networks.

IoT application development platform 370 may support any number of predefined generic IoT device functions and a user may incorporate such generic IoT device functions into source code being developed thereby using source code editor 412. Predefined generic IoT device functions may be defined as part of APIs 424 that are included in code libraries 404 and incorporated by reference into source code. An API for a particular generic IoT device function may specify the types of IoT devices that may be used to implement the generic IoT device function. IoT application development platform 370 may also enable a user to define custom generic IoT device functions by modifying existing generic IoT device functions or by generating entirely new generic IoT device functions.

Source code editor 412 may also enable a user to generate the source code of an IoT application by defining an input of the IoT application in terms of a generic IoT device type and/or by defining an output of the IoT application in terms of a generic IoT device type. For example, source code editor 412 may enable a user developing an IoT application that turns on a light when a package is observed on a front doorstep to associate a generic IoT device type "doorbell camera" with an input of the application and a generic IoT device type "smart lightbulb" with an output of the application.

The aforementioned generic IoT device types need not be associated with any particular IoT devices at the time of application development. Rather, as discussed above in reference to IoT application store 350, smart installation service 354 may map each generic IoT device type to a specific IoT device during installation of the IoT application to a particular network of IoT devices (e.g., the network of IoT devices 306, 308, 310 and 312 in premises 302). For example, in a first network of IoT devices, the generic IoT device type "doorbell camera" may be mapped to a first model of a doorbell camera, while in a second network of IoT devices, the generic IoT device type "doorbell camera" may be mapped to a second model of a doorbell camera (e.g., a different model than the first model from a same or different manufacturer). As another example, in a first network of IoT devices, the generic IoT device type "smart lightbulb" may be mapped to a first model of smart lightbulb, while in a second network of IoT devices, the generic IoT device type may be mapped to a second model of smart lightbulb. This feature can also greatly simplify the development of the IoT application while also ensuring that the IoT application can be used in a wide variety of different IoT device networks.

IoT application development platform 370 may support any number of predefined generic IoT device types and a user may incorporate such generic IoT device types into source code being developed thereby using source code editor 412. Predefined generic IoT device types may be defined as part of APIs 424 that are included in code libraries 404 and incorporated by reference into source code. IoT application development platform 370 may also enable a user to define custom generic IoT device types by modifying existing generic IoT device types or by generating entirely new generic IoT device types.

Source code editor 412 may enable a user to generate the source code of an IoT application by defining an input or output of the IoT application as a combination or sub-combination of an event, a generic IoT device function, a generic IoT device type, or a specific IoT device type. For example, a user may specify an input as an event "detect package" and then assign the generic IoT device type "video doorbell camera" to the event. As another example, a user may specify an output as an event "lock down home" and then assign a specific manufacturer/model of smart door lock to the event. Thus, inputs and outputs may be defined at varying levels of granularity. In accordance with such an implementation, smart installation service 354 may take such input/output definitions into consideration in determining whether the inputs/outputs of a particular IoT application can be mapped to the IoT devices of a particular IoT device network and, if such a mapping is possible, how to execute such mapping.

As noted above, source code editor 412 may comprise a natural language processing model or other algorithm that is capable of generating source code based on natural language input from a user. For example, such an algorithm may be configured to parse natural language input of a user to identify one or more IoT application inputs, one or more IoT application outputs, and logic that relates the input(s) to the output(s), and to generate source code of the IoT application based on such identified elements. For example, a user of source code editor 412 may provide the natural language input "please alert me when the baby is crying" and source code editor 412 may generate source code of an IoT application based on such input that has an input event "baby crying", an output event "notify user", and the processing logic: if "baby crying", then "notify user".

Source code editor 412 may support a plurality of different program languages such that a user thereof can selectively generate source code in any one of the plurality of different programming languages. Such a feature may beneficially enable the user to generate source code in his or her preferred programming language. For example, source code editor 412 may enable a user thereof to generate source code in two or more of Python, Rust, C, C++, Visual Basic, JavaScript, or ladder logic. However, these are only examples, and any number of different or additional programming languages may be supported by source code editor 412.

As noted above, IDE 402 may also include a set of wizards 414. Each wizard 414 may provide a guided development experience that assists users in generating source code of an IoT application. For example, a wizard 414 may utilize a series of dialog boxes or other UI elements to solicit information from a user about how an IoT application should operate and then utilize such information to generate the source code of the IoT application. For example, a wizard 414 may utilize such UI elements to solicit information from the user about the input(s), output(s) and processing logic of the IoT application. IDE 402 may include different wizards 414 for generating different types of IoT applications, respectively.

IDE 402 may further include application builder 416. Application builder 416 may operate to generate an executable version of an IoT application, referred to as a build, based at least on source code (e.g., one or more source code files) of the IoT application generated by a user. Depending upon the programming language used to implement the source code, generating the build may entail performing different operations. In some scenarios, generating the build may comprise compiling source code to generate object code, and then linking object code with libraries to generate an executable version of the IoT application. Generating the build may also entail packaging components of the IoT application (e.g., executables, libraries, resource files, folder structures, etc.) into a form suitable for deployment.

As noted above, source code editor 412 may enable a user to generate source code in a variety of different programming languages. In further accordance with such an implementation, application builder 416 may include features that enable a build to be created from source code generated in a variety of different programming languages. For example, application builder 416 may comprise a plurality of compilers, each of which is configured to compile source code in a different programming language. As another example, application builder 416 may comprise a single multi-language compiler that is capable of compiling source code generated using a variety of different programming languages. As yet another example, application builder 416 may comprise a transpiler that converts source code from a first programming language to a second programming language and a compiler that compiles the source code in the second programming language.

Application builder 416 may generate a plurality of different builds of an IoT application, wherein each build is configured for installation and execution on a different host device or set of host devices. For example, application builder 416 may generate two or more of the following: a build that is suitable for installation and execution on an IoT device (e.g., any of IoT devices 306, 308, 310, 312); a build that is suitable for installation and execution on a user device (e.g., user device 304); a build that is suitable for installation and execution on a cloud computing platform (e.g., cloud deployments 362); or a build that is suitable for distributed installation and execution across a plurality of devices (e.g., across a plurality of IoT devices, across a plurality of user devices, or across a combination of IoT device(s), user device(s) and cloud servers). Multiple builds of an IoT application generated in this manner may be submitted to IoT application store 350, thereby enabling smart installation service 354 and/or an end user of IoT application store 350 to select among a plurality of different installation options at the time of installing the IoT application. For example, as previously described, smart installation service 354 may take into account a variety of factors associated with each eligible host (e.g., cloud, user device, IoT device) and/or the IoT application in determining where to install an IoT application.

IDE 402 may further include simulator 418. Simulator 418 may enable a user to install an IoT application under development to a simulated network of IoT devices (e.g., a simulation of the network of IoT devices 306, 308, 310, 312) and execute the IoT application thereon. The simulated network of IoT devices may include, for example, one or more simulated IoT devices and a simulated hosting platform for the IoT application (which itself may comprise one or more simulated IoT devices, user devices or cloud computing devices). The simulated IoT devices may represent generic IoT device types or specific real world brands/ models of IoT devices.

Simulator 418 may thus enable a developer of an IoT application to determine how an IoT application will operate when installed on different hosting platforms (e.g., cloud, user device, IoT device, distributed) and when interacting with different IoT devices (e.g., (different in terms of device manufacturer and model as well as different in terms of location/orientation). Such a feature can enable the developer to debug the IoT application, optimize the IoT application, ensure that the IoT application will work with certain IoT devices, ensure that the IoT application will work in different installation configurations, and the like.

IoT application development platform 370 may include a library of IoT device network models 406. Each such model 406 may define a different simulated network of IoT devices. Simulator 418 may enable a developer of an IoT application to select a model from library of IoT device network models 406, install the IoT application to a simulated network of IoT devices defined by the selected model, and execute the IoT application thereon. In a scenario in which different end users may own different sets of IoT devices, this feature can advantageously enable a developer to test an IoT application across a variety of different IoT device sets. For example, each model 406 may represented a different IoT device combination and/or configuration, and a developer may utilize each model to test an IoT application therewith.

In addition to enabling a user to install an IoT application under development to a network of simulated IoT devices, simulator 418 may also enable a user to install an IoT application under development to a network of IoT devices that consists entirely of physical IoT devices or to a network of IoT devices that includes a combination of both simulated IoT devices and physical IoT devices. For example, library of IoT device network models 406 may include models that consist entirely of simulated IoT devices, models that consist entirely of physical IoT devices, and models that consist of a combination of simulated IoT devices and physical IoT devices. Thus, a developer of an IoT application is enable to test the application in conjunction with a network of simulated IoT devices, a network of physical IoT devices, or a hybrid network of simulated and physical IoT devices.

Simulator 418 may incorporate features of smart installation service 354 and utilize such features to determine how to map the inputs and/or outputs of an IoT application to the simulated IoT devices of a simulated IoT device network. This can help a developer determine, for example, how an IoT application will operate if an input or output of the IoT application cannot be mapped to an IoT device, or if an input or output of the IoT application is mapped to an IoT device that lacks one or more desired features for implementing the IoT application. For example, this feature may enable the developer to determine if the IoT application will be rendered entirely inoperable in such scenarios or if the performance of the IoT application will gracefully degrade in such scenarios.

Simulator 418 may enable a developer to substitute an input or output of a computing device upon which IoT application development platform 370 is installed for a respective input or output of an IoT application being executed on a simulated IoT device network. For example, simulator 418 may enable a developer to (i) utilize a microphone of the computing device to provide an audio input to the IoT application being executed on the simulated IoT device network, (ii) utilize a camera of the computing device to provide a video input to the IoT application being executed on the simulated IoT device network, (iii) utilize a speaker of the computing device to play back an audio output of the IoT application being executed on the simulated IoT device network, or (iv) utilize a display of the computing device to present a video output of the IoT application being executed on the simulated IoT device network. Simulator 418 may also enable a developer to connect physical IoT devices to the computing device upon which IoT application development platform 370 is installed to enable such physical IoT devices to provide real world inputs or outputs to the IoT application being executed on the simulated IoT device network.

IDE 402 may further include IoT device network model editor 420. IoT device network model editor 420 may enable a user to create new models from scratch or modify existing models in the library of IoT device network models 406. For example, a user may use IoT device network model editor 420 to create or modify a network model consisting entirely of simulated IoT devices, a network model consisting entirely of physical IoT devices, or a network model consisting partly of simulated IoT devices and physical IoT devices. As another example, a user may use IoT device network model editor 420 to add/remove/modify a simulated IoT device included in an existing model. Modifying a simulated IoT device may comprise, for example, changing a model or feature set associated with the simulated IoT device or changing a location or orientation of the simulated IoT device. At a time of installation, IoT application development platform 370 may include a default set of IoT device network models 406 and a user may use IoT device network model editor 420 to view and selectively modify any of the default models to create new models. Newly created or modified models may be saved and optionally shared with other users.

The models included in the library of IoT device network models 406 may be generated in any number of ways. For example, such models may be developed using IoT device network model editor 420. The models may also be based on or derived from virtual deployments generated by virtual deployment service 358. The models may also be based on or derived from a 2D or 3D map of IoT devices associated with a user that may be generated in accordance with the methods described in commonly-owned, co-pending U.S. patent application Ser. No. 18/141,120, filed Apr. 28, 2023, and entitled "Map Generator for Map-Based Device Management."

IDE 402 may further include documentation/API reference viewer 422. This component may be used to view documentation and/or an API reference 408 included with IoT application development platform 370. Documentation and API reference 408 may include (i) a set of supporting documents associated with IoT application development platform 370 and (ii) an API reference associated with IoT application development platform. The set of supporting documents may provide information about how to install the components of IoT application development platform 370 and how such components may be used to develop an IoT application. The set of supporting documents may include information such as tutorials, code snippets, installation guides, or the like. The API reference may contain information about the APIs supported by IoT application development platform 370.

In addition to IDE 402, IoT application development platform 370 may include code libraries 404, IoT device network models 406, documentation and API reference 408, and IoT application submission client 410.

Code libraries 404 comprise code that may be incorporated into source code of an IoT application under development. As shown in FIG. 4, code libraries 404 may include APIs 424, third party APIs 426, templates 428, AI tools 430 and ML models 432. APIs 424 may define programmatic interfaces for interacting with various code libraries, host devices, and/or IoT devices. APIs 424 may be incorporated into source code (e.g., source code generated using source code editor 412) to implement the features of an IoT application. As noted above, APIs 424 may include definitions of certain events, generic IoT device functions, and generic IoT device types that may be incorporated into such source code.

Third party APIs 426 may define programmatic interfaces for third party services to enable such third party services to be integrated into an IoT application under development. For example, third party APIs 426 may include APIs associated with social media platform services, microblogging services, video sharing services, email services, streaming media services, digital assistant services, or the like, and such APIs may be incorporated into an IoT application under development to invoke the features of such services.

Templates 428 may comprise example source code files or modules that a user may access (e.g., via source code editor 412 or other UI) and optionally customize to implement a particular IoT application or feature. For example, IoT application development platform 370 may include (e.g., at installation) any number of templates 428 that a user may access and optionally modify to facilitate programming a particular IoT application or IoT application feature. Templates 428 may make application development easier as well as provide useful examples of how an IoT application or feature should be implemented. A template may include comments that may assist a user in determining how particular aspects of the template can or should be modified to achieve a particular implementation goal.

AI tools 430 may comprise modular AI components that a user may incorporate into an IoT application under development. For example, a generative AI tool may be incorporated into an IoT application to control one or more IoT devices to produce various effects (e.g., to control a set of smart lightbulbs to produce interesting patterns). Such an IoT application may enable a user to provide input (e.g., natural language input) to guide the generative AI. For example, such an IoT application may use a large language model (LLM) to interpret user input (e.g., natural language input) to guide the generative AI.

ML models 432 may comprise ML models that may be incorporated into an IoT application to implement certain features thereof. For example, an ML model may be used to determine whether a particular input event has occurred (e.g., "baby crying") based on sensor input obtained from one or more IoT devices (e.g., an audio input stream). IoT application development platform 370 may further provide a facility by which a developer may train an ML model for use in an IoT application. Furthermore, an ML model may provide for a feature that enables an end user of the IoT application to train the ML model at runtime.

IoT device network models 406 were previously described in reference to simulator 418 and documentation and API reference 408 was previously described in reference to documentation/API reference viewer 422. Therefore, these components will not be described here for the sake of brevity.

IoT application submission client 410 may enable a user to submit an IoT application developed on IoT application development platform 370 to an IoT application store, such as IoT application store 350, for distribution thereby. For example, IoT application submission client 410 may enable a user to upload an IoT application to IoT application submission service 360 that comprises part of IoT application store 350. As noted above, the IoT application that is submitted to IoT application submission service 360 may comprise a plurality of different codebases or builds, each of which may be configured for execution on a different set of host device(s), thereby enabling the IoT application to be selectively installed in a variety of different configurations.

The IoT application that is submitted to IoT application submission service 360 may also comprise source code of the IoT application and IoT application store 350 may operate to generate one or more builds therefrom (e.g., through compiling of the source code), wherein each build may be configured for execution on a different set of host device(s). In this case, IoT application store 350 may perform one or more operations attributed to application builder 416, as previously described.

FIG. 5 illustrates a flow diagram of a method 500 for providing a platform for developing an IoT application, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 4. However, method 500 is not limited to that example embodiment.

In 502, source code editor 412 is provided that enables a user to generate source code of the IoT application, wherein source code editor 412 enables the user to generate the source code of the IoT application by defining an input or output of the IoT application as an event, the event being mappable to a first set of IoT devices in a first network of IoT devices when the IoT application is installed thereto and to a second set of IoT devices in a second network of IoT devices when the IoT application is installed thereto. The first set of IoT devices may include at least one IoT device of a type that is not included in the second set of IoT devices.

Providing source code editor 412 may include, for example, publishing a version of source code editor 412 (e.g., as part of an SDK) in a form suitable for download to a computing device for installation and/or execution thereon. Providing source code editor 412 may also include providing a computer readable medium that stores a version of source code editor 412 that may be installed and/or executed on a computing device. Providing source code editor 412 may also be performed by IDE 402 (or any other software development tool/platform of which source code editor 412 is a feature) during execution thereof.

Source code editor 412 provided in 502 may further enable the user to associate a generic IoT device function with the event, wherein the generic IoT device function is mappable to a first IoT device in the first network of IoT devices when the application is installed thereto and to a second IoT device in the second network of IoT devices when the application is installed thereto.

Source code editor 412 provided in 502 may further enable the user to associate a generic IoT device type with the event, wherein the generic IoT device type is mappable to a first IoT device in the first network of IoT devices when the application is installed thereto and to a second IoT device in the second network of IoT devices when the application is installed thereto.

Source code editor 412 provided in 502 may further enable the user to specify an ML model (e.g., one of ML models 432) to be used to identify an occurrence of the event when the input of the application is defined as the event.

In 504, IoT application builder 416 is provided that generates an executable version of the IoT application based at least on the source code of the IoT application generated in 502.

Providing IoT application builder 416 may include, for example, publishing a version of IoT application builder 416 (e.g., as part of an SDK) in a form suitable for download to a computing device for installation and/or execution thereon. Providing IoT application builder 316 may also include providing a computer readable medium that stores a version of IoT application builder 416 that may be installed and/or executed on a computing device. Providing IoT application builder 416 may also be performed by IDE 402 (or any other software development tool/platform of which source code editor 412 is a feature) during execution thereof.

Source code editor 412 provided in 502 may further enable the user to selectively generate the source code in one of a plurality of programming languages and IoT application builder 416 provided in 504 may be configured to generate the executable version of the application based at least on the source code of the application selectively generated in the one of the plurality of programming languages.

Method 500 may further include one or more of the following: providing a template (e.g., one of templates 428) that may be customized by the user to generate the source code of the application; or providing a wizard (e.g., one of wizards 414) that guides the user through a series of steps to generate the source code of the application.

FIG. 6 illustrates a flow diagram of a method 600 for generating different executable versions of an IoT application for installation and execution on a variety of different host devices, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 4. However, method 600 is not limited to that example embodiment.

In 602, IoT application builder 416 receives the generated source code of the IoT application. For example, IoT application builder 416 may receive source code of the IoT application generated using source code editor 412, wizards 414, templates 428, or in some other manner. The generated source code of the IoT application may also include source code from one or more code libraries 404.

In 604, based at least on the generated source code of the IoT application, IoT application builder 416 generates an executable version of the IoT application that is suitable for installation and execution on an IoT device (e.g., any of IoT devices 306, 308, 310 and 312).

In 606, based at least on the generated source code of the IoT application, IoT application builder 416 generates an executable version of the IoT application that is suitable for installation and execution on a user device (e.g., user device 304).

In 608, based at least on the generated source code of the IoT application, IoT application builder 416 generates an executable version of the IoT application that is suitable for installation and execution on a cloud computing platform (e.g., cloud deployments 362).

In 610, based at least on the generated source code of the IoT application, IoT application builder 416 generates an executable version of the IoT application that is suitable for distributed installation and execution across a plurality of devices (e.g., across a plurality of IoT devices, across a plurality of user devices, or across a combination of IoT device(s), user device(s) and cloud servers).

FIG. 7 illustrates a flow diagram of a method 700 for providing a platform for developing an IoT application that enables a user of the platform to execute the IoT application on a simulated network of IoT devices, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 4. However, method 700 is not limited to that example embodiment.

In 702, library of IoT device network models 406 is provided, wherein each model in library of IoT device network models defines a different simulated network of IoT devices.

Providing library of IoT device network models 406 may include, for example, publishing library of IoT device network models 406 (e.g., as part of an SDK) in a form suitable for download to a computing device or providing a computer readable medium that stores library of IoT device network models 406. Providing library of IoT device network models 406 may also be performed by IoT application development platform 370 (or any other software development tool/ platform of which source library of IoT device network models 406 is a feature) during execution thereof.

In 704, simulator 418 is provided that enables the user to select a model in library of IoT device network models 406 and install the IoT application to a simulated network of IoT devices defined by the selected model and execute the IoT application thereon.

Providing simulator 418 may include, for example, publishing a version of simulator 418 (e.g., as part of an SDK) in a form that is suitable for download to a computing device for installation and/or execution thereon. Providing simulator 418 may also include providing a computer readable medium that stores a version of simulator 418 that may be installed and/or executed on a computing device. Providing simulator 418 may also be performed by IDE 402 (or any other software development tool/platform of which simulator 418 is a feature) during execution thereof.

In 706, IoT device network model editor 420 is provided that enables the user to create a new model or modify an existing model in library of IoT device network models 406. As discussed above, device network model editor 420 may enable the user to create a new model or modify an existing model that consists entirely of simulated IoT devices, consists entirely of physical IoT devices, or consists partly of simulated IoT devices and partly of physical IoT devices. All of these model types may be incorporated into library of IoT device network models 406, may be simulated by simulator 418, may be modified by IoT device network model editor 420 and may be operated on by any or all of the facilities of IoT device network models as described herein.

Providing IoT device network model editor 420 may include, for example, publishing a version of IoT device network model editor 420 (e.g., as part of an SDK) in a form that is suitable for download to a computing device for installation and/or execution thereon. Providing IoT device network model editor 420 may also include providing a computer readable medium that stores a version of IoT device network model editor 420 that may be installed and/or executed on a computing device. Providing IoT device network model editor 420 may also be performed by IDE 402 (or any other software development tool/platform of which IoT device network model editor 420 is a feature) during execution thereof.

Example Computer System

Figure 8:
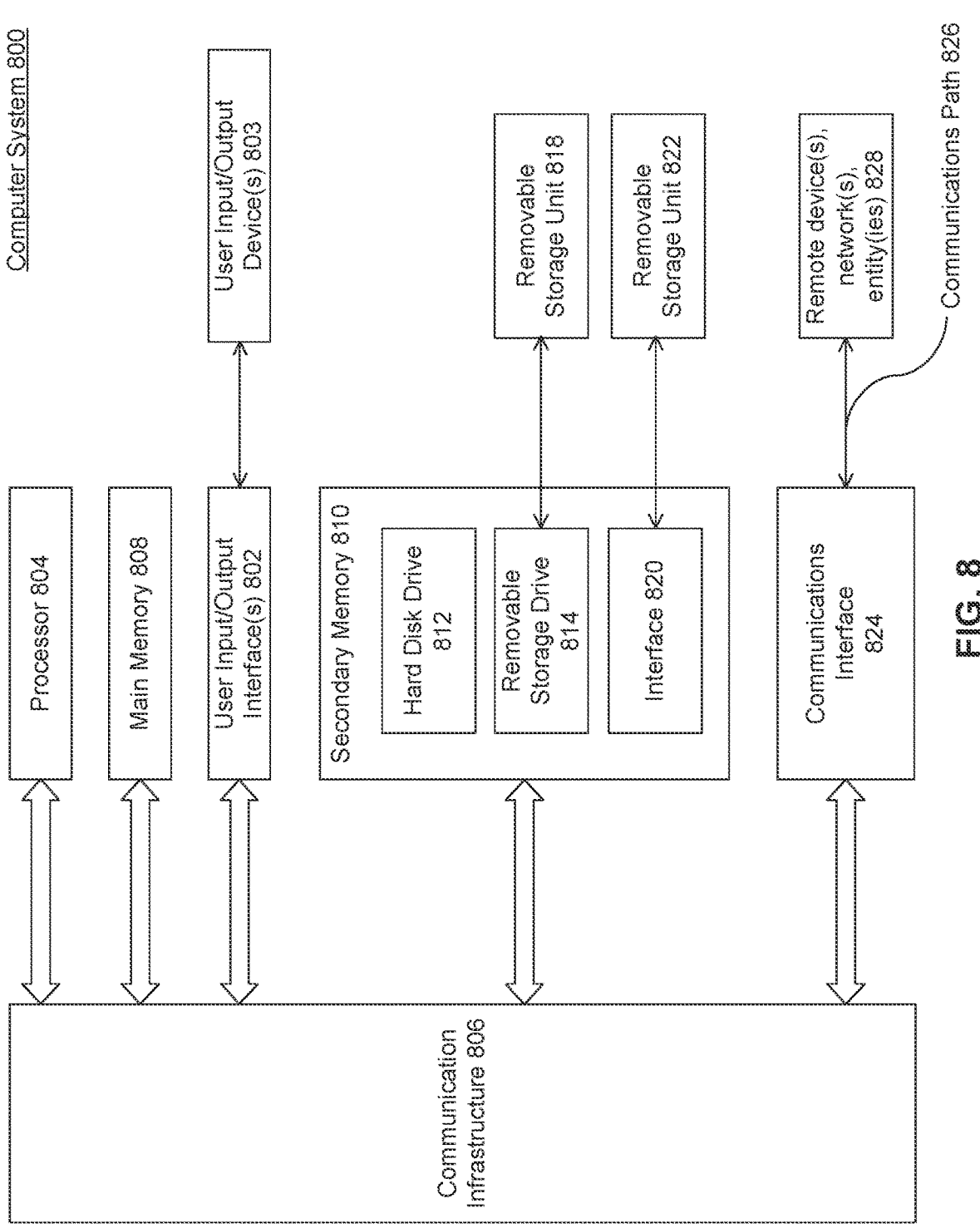
FIG. 8 illustrates an example computer system useful for implementing various embodiments.

Various embodiments may be implemented, for example, using one or more well-known computer systems, such as computer system 800 shown in FIG. 8. For example, one or more of user device 304, IoT device 306, IoT device 308, IoT device 310, IoT device 312, IoT application store 350, digital marketplace service 352, smart installation service 354, automatic updating service 356, virtual deployment service 358, IoT application submission service 360, cloud deployments 362, IoT application development platform 370, IDE 402, or IoT application submission client 410 may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818.

Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing a platform for developing an application that interacts with a set of Internet of Things (IoT) devices, comprising:

providing, by at least one computer processor, a source code editor that enables a user to generate source code of the application, wherein enabling the user to generate the source code of the application includes enabling the user to define an input of the application or an output of the application as an event, identifying IoT devices that provide the input or produce the output, and prompting the user to select an IoT device from the identified IoT devices, the event being mappable to a first set of IoT devices in a first network of IoT devices when the application is installed thereto and to a second set of IoT devices in a second network of IoT devices when the application is installed thereto, the first set of IoT devices including at least one IoT device of a type that is not included in the second set of IoT devices; and providing an application builder that generates an executable version of the application based at least on the generated source code of the application.

2. The computer-implemented method of claim 1, wherein the source code editor enables the user to associate a generic IoT device function with the event and wherein the generic IoT device function is mappable to a first IoT device in the first network of IoT devices when the application is installed thereto and to a second IoT device in the second network of IoT devices when the application is installed thereto.

3. The computer-implemented method of claim 1, wherein the source code editor enables the user to associate a generic IoT device type with the event and wherein the generic IoT device type is mappable to a first IoT device in the first network of IoT devices when the application is installed thereto and to a second IoT device in the second network of IoT devices when the application is installed thereto.

4. The computer-implemented method of claim 1, wherein the source code editor enables the user to specify a machine learning model to be used to identify an occurrence of the event when the input of the application is defined as the event.

5. The computer-implemented method of claim 1, wherein providing the application builder comprises providing an application builder that, based at least on the generated source code of the application, generates two or more of:

an executable version of the application that is suitable for installation and execution on an IoT device;

an executable version of the application that is suitable for installation and execution on a user device;

an executable version of the application that is suitable for installation and execution on a cloud computing platform; or an executable version of the application that is suitable for distributed installation and execution across a plurality of devices.

6. The computer-implemented method of claim 1, wherein the source code editor enables the user to selectively generate the source code in one of a plurality of programming languages, and wherein the application builder is configured to generate the executable version of the application based at least on the source code of the application selectively generated in the one of the plurality of programming languages.

7. The computer-implemented method of claim 1, further comprising:

providing a simulator that enables the user to install the application to a simulated network of IoT devices and execute the application thereon.

8. The computer-implemented method of claim 7, further comprising:

providing a library of models, wherein each model in the library of models defines a different simulated network of IoT devices; and wherein the simulator enables the user to select a model in the library of models and install the application to a simulated network of IoT devices defined by the selected model and execute the application thereon.

9. The computer-implemented method of claim 8, further comprising:

providing a model editor that enables the user to create a new model or modify an existing model in the library of models.

10. A system for providing a platform for developing an application that interacts with a set of Internet of Things (IoT) devices, comprising:

one or more memories; and at least one processor each coupled to at least one of the memories and configured to perform operations comprising:

providing a source code editor that enables a user to generate source code of the application, wherein enabling the user to generate the source code of the application includes enabling the user to define an input of the application or an output of the application as an event, identifying IoT devices that provide the input or produce the output, and prompting the user to select an IoT device from the identified IoT devices, the event being mappable to a first set of IoT devices in a first network of IoT devices when the application is installed thereto and to a second set of IoT devices in a second network of IoT devices when the application is installed thereto, the first set of IoT devices including at least one IoT device of a type that is not included in the second set of IoT devices; and providing an application builder that generates an executable version of the application based at least on the generated source code of the application.

11. The system of claim 10, wherein the source code editor enables the user to associate a generic IoT device function with the event and wherein the generic IoT device function is mappable to a first IoT device in the first network of IoT devices when the application is installed thereto and to a second IoT device in the second network of IoT devices when the application is installed thereto.

12. The system of claim 10, wherein the source code editor enables the user to associate a generic IoT device type with the event and wherein the generic IoT device type is mappable to a first IoT device in the first network of IoT devices when the application is installed thereto and to a second IoT device in the second network of IoT devices when the application is installed thereto.

13. The system of claim 10, wherein the source code editor enables the user to specify a machine learning model to be used to identify an occurrence of the event when the input of the application is defined as the event.

14. The system of claim 10, wherein providing the application builder comprises providing an application builder that, based at least on the generated source code of the application, generates two or more of:

an executable version of the application that is suitable for installation and execution on an IoT device;

an executable version of the application that is suitable for installation and execution on a user device;

an executable version of the application that is suitable for installation and execution on a cloud computing platform; or an executable version of the application that is suitable for distributed installation and execution across a plurality of devices.

15. The system of claim 10, wherein the source code editor enables the user to selectively generate the source code in one of a plurality of programming languages, and wherein the application builder is configured to generate the executable version of the application based at least on the source code of the application selectively generated in the one of the plurality of programming languages.

16. The system of claim 10, wherein the operations further comprise:

providing a simulator that enables the user to install the application to a simulated network of IoT devices and execute the application thereon.

17. The system of claim 16, wherein the operations further comprise:

providing a library of models, wherein each model in the library of models defines a different simulated network of IoT devices; and wherein the simulator enables the user to select a model in the library of models and install the application to a simulated network of IoT devices defined by the selected model and execute the application thereon.

18. The system of claim 17, wherein the operations further comprise:

providing a model editor that enables the user to create a new model or modify an existing model in the library of models.

19. A non-transitory computer-readable medium having instructions stored thereon that, when executed by at least one computing device, causes the at least one computing device to perform operations, the operations comprising:

providing a source code editor that enables a user to generate source code of an application that interacts with a set of Internet of Things (IoT) devices, wherein enabling the user to generate the source code of the application includes enabling the user to define an input of the application or an output of the application as an event, identifying IoT devices that provide the input or produce the output, and prompting the user to select an IoT device from the identified IoT devices, the event being mappable to a first set of IoT devices in a first network of IoT devices when the application is installed thereto and to a second set of IoT devices in a second network of IoT devices when the application is installed thereto, the first set of IoT devices including at least one IoT device of a type that is not included in the second set of IoT devices; and providing an application builder that generates an executable version of the application based at least on the generated source code of the application.

20. The non-transitory computer-readable medium of claim 19, wherein the operations further comprise:

providing a simulator that enables the user to install the application to a simulated network of IoT devices and execute the application thereon.

* * * * *